US012580616B2

(12) United States Patent

Zhang et al.

(10) Patent No.: US 12,580,616 B2

(45) Date of Patent: Mar. 17, 2026

(54) AZIMUTH MODE CONFIGURATIONS FOR ORBITAL ANGULAR MOMENTUM MULTIPLEXING BASED COMMUNICATION

(71) Applicant: QUALCOMM Incorporated, San Diego, CA (US)

(72) Inventors: Danlu Zhang, San Diego, CA (US); Min Huang, Beijing (CN); Yu Zhang, San Diego, CA (US); Hao Xu, Beijing (CN); Jun Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 92 days.

(21) Appl. No.: 18/685,432

(22) PCT Filed: Oct. 14, 2021

(86) PCT No.: PCT/CN2021/123775

§ 371 (c)(1),
(2) Date: Feb. 21, 2024

(87) PCT Pub. No.: WO2023/060502

PCT Pub. Date: Apr. 20, 2023

(65) Prior Publication Data

US 2024/0356600 A1      Oct. 24, 2024

(51) Int. Cl.
*H04B 7/06*        (2006.01)
*H04B 7/08*        (2006.01)

(52) U.S. Cl.
CPC ......... *H04B 7/0617* (2013.01); *H04B 7/0691* (2013.01); *H04B 7/0874* (2013.01)

(58) Field of Classification Search
CPC ... H04B 7/0617; H04B 7/0691; H04B 7/0874
See application file for complete search history.

(56) References Cited

U.S. PATENT DOCUMENTS

| | | | |
|---|---|---|---|
| 2017/0117626 A1 | 4/2017 | Sajuyigbe et al. | |
| 2018/0262243 A1* | 9/2018 | Ashrafi | ................... H04B 7/10 |
| 2020/0313307 A1 | 10/2020 | Lee et al. | |
| 2021/0377773 A1* | 12/2021 | Hu | ......................... H04W 24/10 |
| 2021/0399940 A1* | 12/2021 | Huang | .................... H04L 41/06 |

OTHER PUBLICATIONS

International Search Report and Written Opinion—PCT/CN2021/123775—ISA/EPO—May 4, 2022.

* cited by examiner

*Primary Examiner* — Jean B Corrielus

(74) *Attorney, Agent, or Firm* — Harrity & Harrity LLP

(57) ABSTRACT

Various aspects of the present disclosure generally relate to orbital angular momentum (OAM) multiplexing based communication. In some aspects, a transmitter of OAM multiplexing based communication may determine an azimuth mode configuration for transmitting a data stream, wherein the azimuth mode configuration indicates one or more azimuth modes. The transmitter may transmit, to a receiver of the OAM multiplexing based communication, the data stream based at least in part on the azimuth mode configuration. Numerous other aspects are described.

28 Claims, 12 Drawing Sheets

900

910 — Determine an azimuth mode configuration for transmitting a data stream, wherein the azimuth mode configuration indicates one or more azimuth modes 920 — Transmit, to a receiver of the OAM multiplexing based communication, the data stream based at least in part on the azimuth mode configuration Determine an azimuth mode configuration for transmitting a data stream, wherein the azimuth mode configuration indicates one or more azimuth modes

910

Transmit, to a receiver of the OAM multiplexing based communication, the data stream based at least in part on the azimuth mode configuration

920

900

1010 — Determine an azimuth mode configuration for receiving a data stream, wherein the azimuth mode configuration indicates one or more azimuth modes 1020 — Receive, from a transmitter of the OAM multiplexing based communication, the data stream based at least in part on the azimuth mode configuration

1000

AZIMUTH MODE CONFIGURATIONS FOR ORBITAL ANGULAR MOMENTUM MULTIPLEXING BASED COMMUNICATION

CROSS-REFERENCE TO RELATED APPLICATION

This Patent Application is a 371 national stage of PCT Application No. PCT/CN2021/123775, filed on Oct. 14, 2021, entitled "AZIMUTH MODE CONFIGURATIONS FOR ORBITAL ANGULAR MOMENTUM MULTIPLEX-ING BASED COMMUNICATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for azimuth mode configurations for orbital angular momentum multiplexing based communication.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/ LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
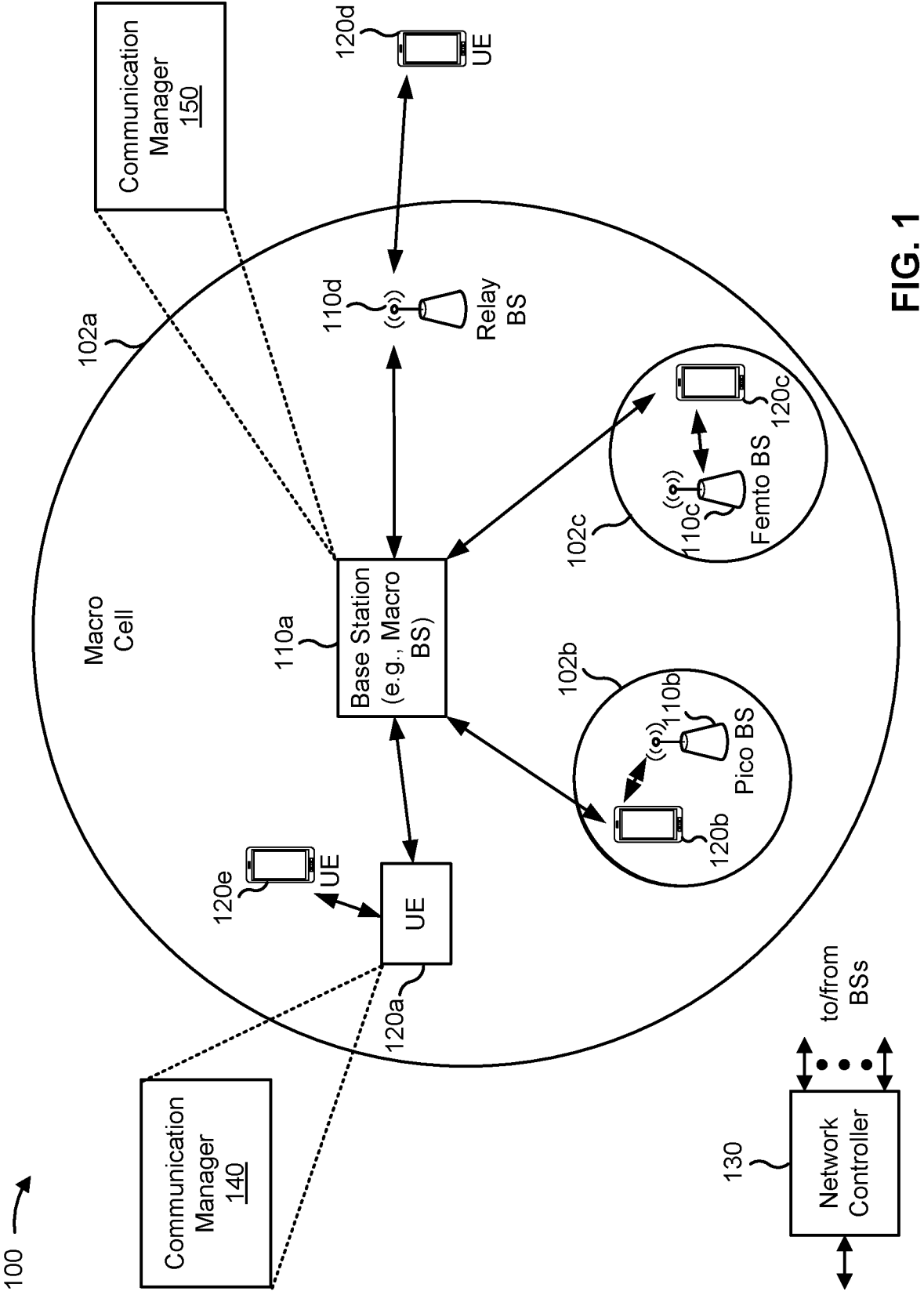
FIG. 1 is a diagram illustrating an example of a wireless network, in accordance with the present disclosure.

In some aspects, a transmitter for orbital angular momentum (OAM) multiplexing based communication includes a memory and one or more processors, coupled to the memory, configured to: determine an azimuth mode configuration for transmitting a data stream, wherein the azimuth mode configuration indicates one or more azimuth modes; and transmit, to a receiver of the OAM multiplexing based communication, the data stream based at least in part on the azimuth mode configuration.

In some aspects, a receiver for OAM multiplexing based communication includes a memory and one or more processors, coupled to the memory, configured to: determine an azimuth mode configuration for receiving a data stream, wherein the azimuth mode configuration indicates one or more azimuth modes; and receive, from a transmitter of the OAM multiplexing based communication, the data stream based at least in part on the azimuth mode configuration.

In some aspects, a method of wireless communication performed by a transmitter of OAM multiplexing based communication includes determining an azimuth mode configuration for transmitting a data stream, wherein the azimuth mode configuration indicates one or more azimuth modes; and transmitting, to a receiver of the OAM multiplexing based communication, the data stream based at least in part on the azimuth mode configuration.

In some aspects, a method of wireless communication performed by a receiver of OAM multiplexing based communication includes determining an azimuth mode configuration for receiving a data stream, wherein the azimuth mode configuration indicates one or more azimuth modes; and receiving, from a transmitter of the OAM multiplexing based communication, the data stream based at least in part on the azimuth mode configuration.

In some aspects, a non-transitory computer-readable medium storing a set of instructions for wireless communication includes one or more instructions that, when executed by one or more processors of a transmitter of OAM multiplexing based communication, cause the transmitter to: determine an azimuth mode configuration for transmitting a data stream, wherein the azimuth mode configuration indicates one or more azimuth modes; and transmit, to a receiver of the OAM multiplexing based communication, the data stream based at least in part on the azimuth mode configuration.

In some aspects, a non-transitory computer-readable medium storing a set of instructions for wireless communication includes one or more instructions that, when executed by one or more processors of a receiver of OAM multiplexing based communication, cause the receiver to: determine an azimuth mode configuration for receiving a data stream, wherein the azimuth mode configuration indicates one or more azimuth modes; and receive, from a transmitter of the OAM multiplexing based communication, the data stream based at least in part on the azimuth mode configuration.

In some aspects, an apparatus for OAM multiplexing based communication includes means for determining an azimuth mode configuration for transmitting a data stream, wherein the azimuth mode configuration indicates one or more azimuth modes; and means for transmitting, to a receiver of the OAM multiplexing based communication, the data stream based at least in part on the azimuth mode configuration.

In some aspects, an apparatus for OAM multiplexing based communication includes means for determining an azimuth mode configuration for receiving a data stream, wherein the azimuth mode configuration indicates one or more azimuth modes; and means for receiving, from a transmitter of the OAM multiplexing based communication, the data stream based at least in part on the azimuth mode configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antenna, radio frequency (RF) chains, power amplifiers, modulators, buffer, processor(s), interleavers, adders, or summers). It is intended that aspects described herein may be practiced in a wide variety of devices, components, systems, distributed arrangements, or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

In some aspects, a transmitter for orbital angular momentum (OAM) multiplexing based communication may include a communication manager 140 (in a case in which the transmitter is implemented at a UE) or a communication manager 150 (in a case in which the transmitter is implemented at a base station). As described in more detail elsewhere herein, the communication manager 140 or 150 may determine an azimuth mode configuration for transmitting a data stream, wherein the azimuth mode configuration indicates one or more azimuth modes; and transmit, to a receiver of the OAM multiplexing based communication, the data stream based at least in part on the azimuth mode configuration. Additionally, or alternatively, the communication manager 140 or 150 may perform one or more other operations described herein.

In some aspects, a receiver for OAM multiplexing based communication may include a communication manager 140 (in a case in which the receiver is implemented at a UE) or a communication manager 150 (in a case in which the receiver is implemented at a base station). As described in more detail elsewhere herein, the communication manager 140 or 150 may determine an azimuth mode configuration for receiving a data stream, wherein the azimuth mode configuration indicates one or more azimuth modes; and receive, from a transmitter of the OAM multiplexing based communication, the data stream based at least in part on the azimuth mode configuration. Additionally, or alternatively, the communication manager 140 or 150 may perform one or more other operations described herein.

As indicated above, FIG. 1 is provided as an example. Other examples may differ from what is described with regard to FIG. 1.

Figure 2:
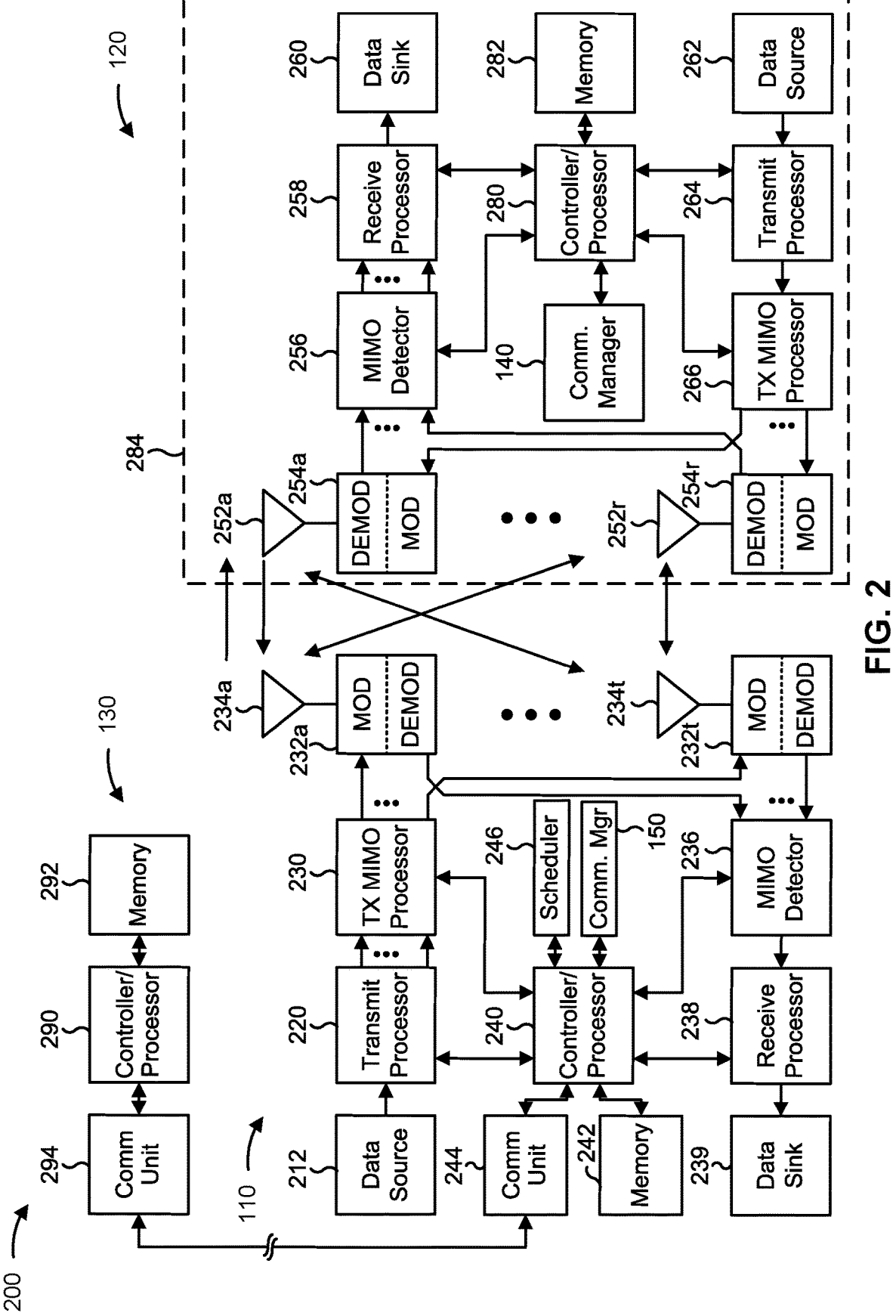
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 9-10.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 9-10.

Controller/processor 240 of base station 110, controller/processor 280 of UE 120, and/or any other component(s) of FIG. 2 may perform one or more techniques associated with azimuth mode configurations for OAM multiplexing based communication, as described in more detail elsewhere herein. In some aspects, the receiver and/or transmitter described herein is the base station 110, is included in the base station 110, or includes one or more components of the base station 110 shown in FIG. 2. In some aspects, the receiver and/or transmitter described herein is the UE 120, is included in the UE 120, or includes one or more components of the UE 120 shown in FIG. 2. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, a transmitter for OAM multiplexing based communication includes means for determining an azimuth mode configuration for transmitting a data stream, wherein the azimuth mode configuration indicates one or more azimuth modes; and/or means for transmitting, to a receiver of the OAM multiplexing based communication, the data stream based at least in part on the azimuth mode configuration. In some aspects, the means for the transmitter to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the transmitter to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

In some aspects, a receiver for OAM multiplexing based communication includes means for determining an azimuth mode configuration for receiving a data stream, wherein the azimuth mode configuration indicates one or more azimuth modes; and/or means for receiving, from a transmitter of the OAM multiplexing based communication, the data stream based at least in part on the azimuth mode configuration. In some aspects, the means for the receiver to perform operations described herein may include, for example, one or more of communication manager 150, transmit processor 220, TX MIMO processor 230, modulator 232, antenna 234, demodulator 232, MIMO detector 236, receive processor 238, controller/processor 240, memory 242, or scheduler 246. In some aspects, the means for the receiver to perform operations described herein may include, for example, one or more of communication manager 140, antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
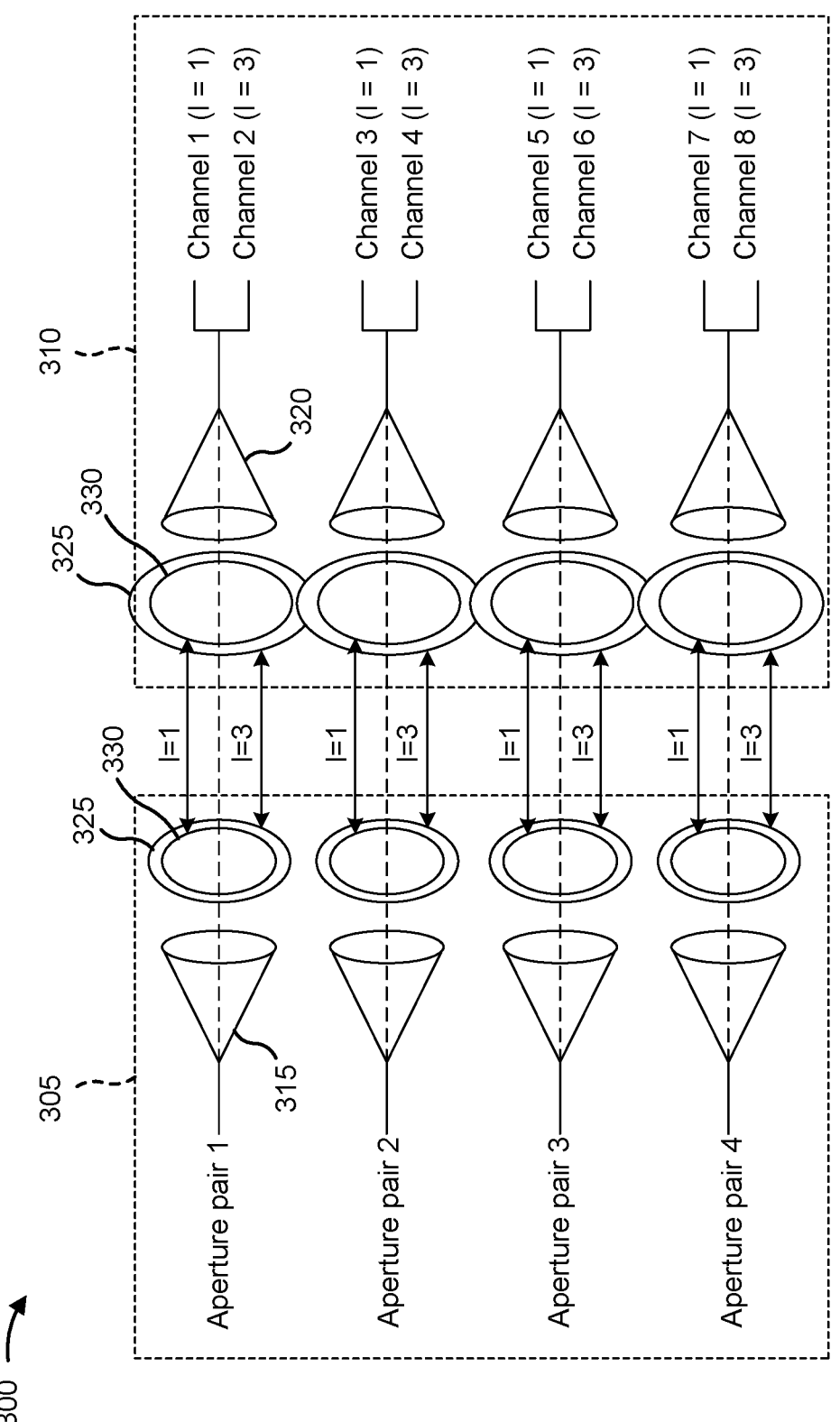
FIGS. 3-5 are diagrams illustrating examples of multi-aperture orbital angular momentum (OAM) multiplexing based communication, in accordance with the present disclosure.

FIG. 3 is a diagram illustrating an example 300 of multi-aperture OAM multiplexing based communication, in accordance with various aspects of the present disclosure. As shown, a transmitter 305 and a receiver 310 may communicate with one another using OAM multiplexing based communication. According to various aspects, the transmitter 305 and/or the receiver 310 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

Communication based on OAM multiplexing may provide spatial multiplexing as a means to increasing high data rates. In OAM multiplexing based communication, the transmitter 305 may radiate multiple coaxially propagating, spatially-overlapping waves (OAM azimuth mode I= . . . , −2, −1, 0, 1, 2, . . . ), each carrying a data stream through a transmitter aperture 315 to a receiver aperture 320. An electromagnetic wave with a helical transverse phase of the form $\exp(i\varphi l)$ may be used to carry an OAM azimuth mode waveform, where $\varphi$ is the azimuthal angle and l is an unbounded integer (referred as the "OAM azimuth mode order," or, in some aspects, the "OAM azimuth mode"). Multiple OAM waves can be orthogonally transmitted using the same radio resources (time and/or frequency domains); thus, using OAM multiplexing can greatly improve communication spectrum efficiency.

To further increase the communication throughput, as shown in FIG. 3, multiple pairs of apertures (where each pair includes a transmitter aperture 315 and a corresponding receiver aperture 320) may be applied in parallel. In some cases, one pair of transmitter and receiver apertures can have M spatially-multiplexed channels (OAM azimuth modes), in which case N pairs of apertures can have MN spatially-multiplexed channels (OAM modes). The term "OAM azimuth mode" may refer to a particular spatially-multiplexed channel or, equivalently, an OAM azimuth waveform (which may be interchangeably referred to as an OAM azimuth mode waveform). An OAM mode may include an OAM azimuth mode and/or a OAM radial mode. For example, an OAM azimuth mode may include a particular spatially multiplexed channel in which the phase changes along a particular azimuth angle based on its OAM azimuthal mode order. An OAM radial mode may include a particular spatially multiplexed channel defined by a beamforming weight associated with an antenna radius based on its OAM radial mode order. The channels in one pair of apertures may be mutually orthogonal and have no or trivial mutual interference. However, the channels in different pairs of apertures may be non-orthogonal and have mutual interference.

For example, as shown in FIG. 3, as a beam travels from the transmitter aperture 315 to the corresponding receiver aperture 320, the outer bound (referred to herein as a radiation circle) 325, 330 of each beam azimuth mode expands. As shown, radiation circles 325 associated with waves with higher-order azimuth modes (e.g., I=3) expand faster than radiation circles 330 associated with waves with lower-order azimuth modes (e.g., I=1). As a result, the mutual interference is more severe among higher-order azimuth modes than among lower-order azimuth modes, and may cause a reduction in throughput, signal reliability, signal quality, and/or the like.

In some aspects, a higher-order azimuth mode (which also may be referred to as a "high azimuth mode," a "higher azimuth mode," and/or a "high-order azimuth mode") may refer to an OAM azimuth mode specified in a wireless communication specification as being a higher-order azimuth mode. In some aspects, a higher order azimuth mode may refer to a azimuth mode of a certain order or order range (e.g., a mode having an order greater than 1, etc.). In some aspects, a higher-order azimuth mode may refer to an OAM azimuth mode that is determined to be associated with a certain type of transmission, coding scheme, multiplexing scheme, and/or the like. For example, a higher-order azimuth mode may refer to an azimuth OAM mode associated with interference, spatial diversity transmissions, and/or the like.

Similarly, a lower-order azimuth mode (which also may be referred to as a "low azimuth mode," a "lower azimuth mode," and/or a "low-order azimuth mode") may refer to an OAM azimuth mode specified in a wireless communication specification as being a lower-order azimuth mode. In some aspects, a lower order azimuth mode may refer to a azimuth mode of a certain order or order range (e.g., a mode having an order less than 2, etc.). In some aspects, a lower-order azimuth mode may refer to an OAM azimuth mode that is determined to be associated with a certain type of transmission, coding scheme, multiplexing scheme, and/or the like. For example, a lower-order azimuth mode may refer to an OAM azimuth mode associated with a lack of interference, spatial multiplexing transmissions, and/or the like.

As indicated above, FIG. 3 is provided as an example. Other examples may differ from what is described with regard to FIG. 3.

Figure 4:
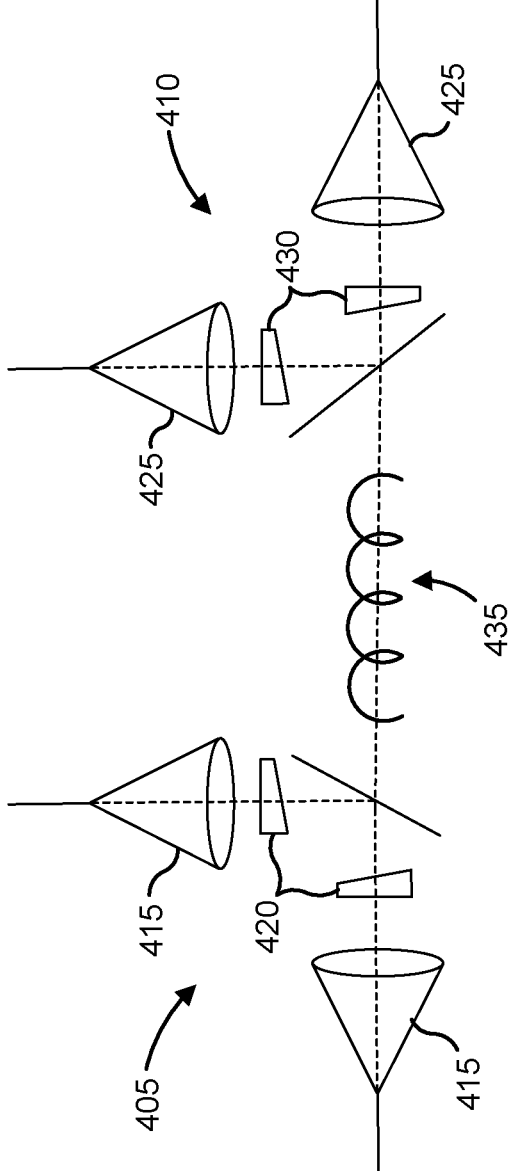

FIG. 4 is a diagram illustrating an example 400 of multi-aperture OAM multiplexing based communication, in accordance with various aspects of the present disclosure. As shown, a transmitter 405 and a receiver 410 may communicate with one another using OAM multiplexing based communication. According to various aspects, the transmitter 405 and/or the receiver 410 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 405 may include a number of transmitter apertures 415 and a number of corresponding transmitter spiral phase plates (SPPs) 420. The receiver 410 may include a number of receiver apertures 425 and a number of corresponding receiver SPPs 430. Each transmitter aperture 415 may transmit a wave of one OAM azimuth mode (shown as, e.g., l=−1 and l=1). Each wave may be modulated by a corresponding transmitter SPP 420 to create a spiral wave 435. In some aspects, transmitter SPPs may be, or include, transmitter circles. Similarly, receiver SPPs may be, or include, receiver circles. For example, in some aspects, each SPP may be referred to as a transmitter circle (or receiver circle) due to the circular nature of cross sections of the spiral wave emitted (or received).

Each receiver aperture 425 may receive the wave 435 transmitted by a corresponding transmitter. The wave 435 may be demodulated by a corresponding receiver SPP 430 to convert the spiral wave into a donut-shaped wave that is received by the corresponding receiver aperture 425. Due to mutual orthogonality among OAM modes, the wave 435 of one OAM azimuth mode may not be received by a receiver aperture 425 corresponding to the other azimuth OAM mode.

As indicated above, FIG. 4 is provided as an example. Other examples may differ from what is described with regard to FIG. 4.

Figure 5:
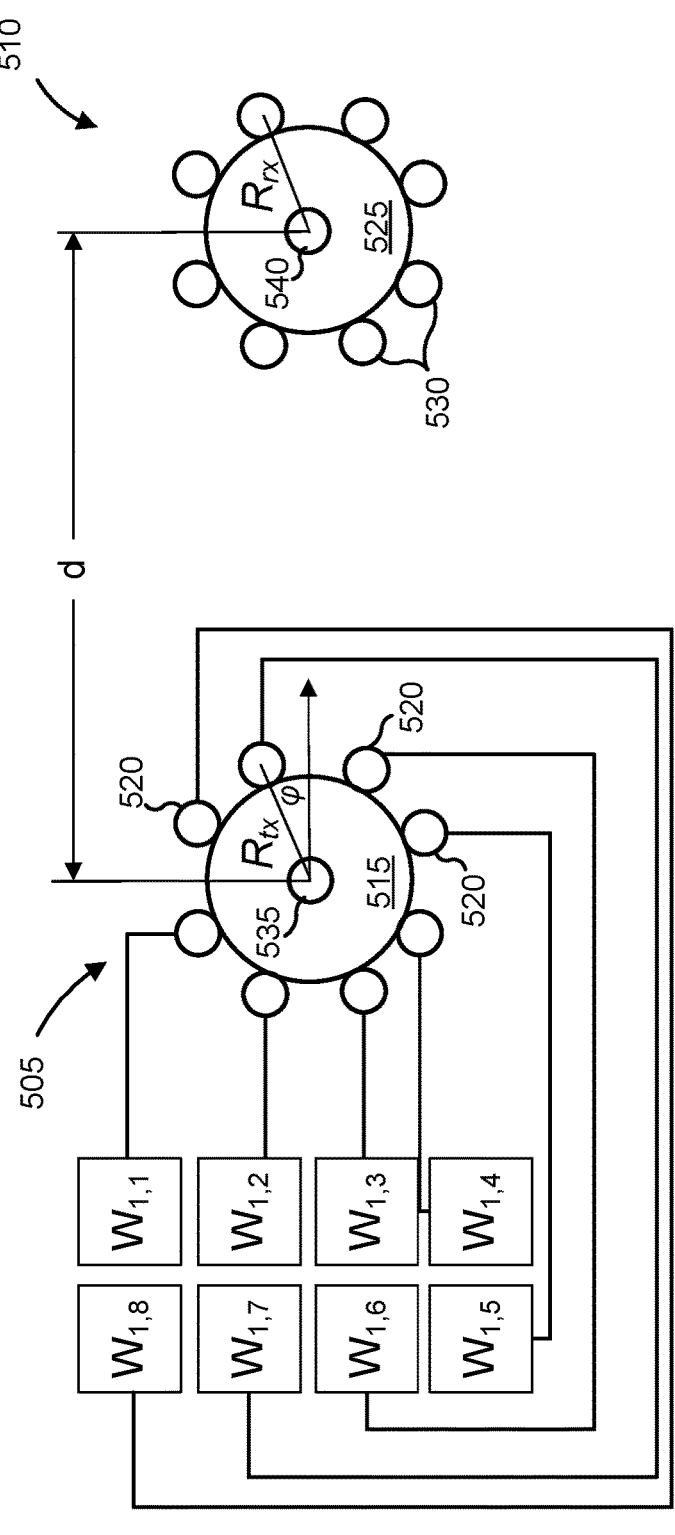

FIG. 5 is a diagram illustrating an example 500 of multi-aperture OAM multiplexing based communication using uniform circular array (UCA) antennas, in accordance with various aspects of the present disclosure. As shown, a transmitter 505 and a receiver 510 may communicate with one another using OAM multiplexing based communication. According to various aspects, the transmitter 505 and/or the receiver 510 may be implemented in connection with one or more UEs (e.g., the UE 120 shown in FIG. 1, and/or the like), one or more base stations (e.g., the base station 110 shown in FIG. 1, and/or the like), one or more vehicles having one or more onboard UEs, and/or the like.

As shown, the transmitter 505 includes a UCA 515 having a plurality of OAM antennas 520 configured in a circle (or an at least approximately circular shape). Similarly, the receiver 510 includes a UCA 525 having a plurality of OAM antennas 530 equipped in a circle (or an at least approximately circular shape). By multiplying respective beamforming weights $w_1=[w_{1,1}, w_{1,2}, \ldots, w_{1,8}]$ onto each antenna, the transmitter 505 may generate a signal port. If the weight of each antenna 520 is equal to $\exp(i\varphi l)$, where $\varphi$ is the angle of antenna in the circle (also referred to, interchangeably, as the "azimuth angle"), l is the OAM azimuth mode order, then the beamformed port may be an equivalent OAM azimuth mode l, a particular spatially multiplexed channel (e.g., one where the phase changes along a particular azimuth angle based on its OAM azimuth mode order). By using different beamforming weights $\exp(i\varphi l')$, where $l'\neq l$, the transmitter 505 may generate multiple OAM azimuth modes.

For a channel matrix, H, from each transmit antenna 520 to each receive antenna 530, the beamformed channel matrix $\tilde{H}=H\cdot[w_i, w_2, \ldots, w_L]$, and any two columns of $\tilde{H}$ are orthogonal. Thus, the beamformed ports have no crosstalk. As a result, UCA OAM-based communication may realize high-level spatial multiplexing degree efficiently. In some cases, a center antenna 535 of the transmitter 505 and/or the center antenna 540 of the receiver 510 may be used to generate an azimuth mode 0. For example, the center antenna 535 and/or 540 may be used alone (without any other antenna of the respective circle) to generate the azimuth mode 0.

As explained above, OAM communications may use SPP or UCA antennas to transmit multiple orthogonal signals with different OAM azimuth modes. SPP-based OAM generates continuous spiral waves, and thus can form unlimited number of orthogonal OAM azimuth modes in theory. But in practice, due to propagation divergence and one azimuth mode per SPP, the number of effective azimuth OAM modes is limited (e.g., four azimuth modes in academic experiment). UCA-based OAM generates discrete spiral waves, and thus can form as many OAM azimuth modes as there are transmitter antennas. UCA-based OAM may be considered to be a form of MIMO whose eigen-based transmission precoding weights and reception combining weights are constantly equal to a discrete Fourier transform matrix, which is unaffected by communication parameters (e.g., distance, aperture size and carrier frequency) and thus can be implemented at low cost.

Figure 6:
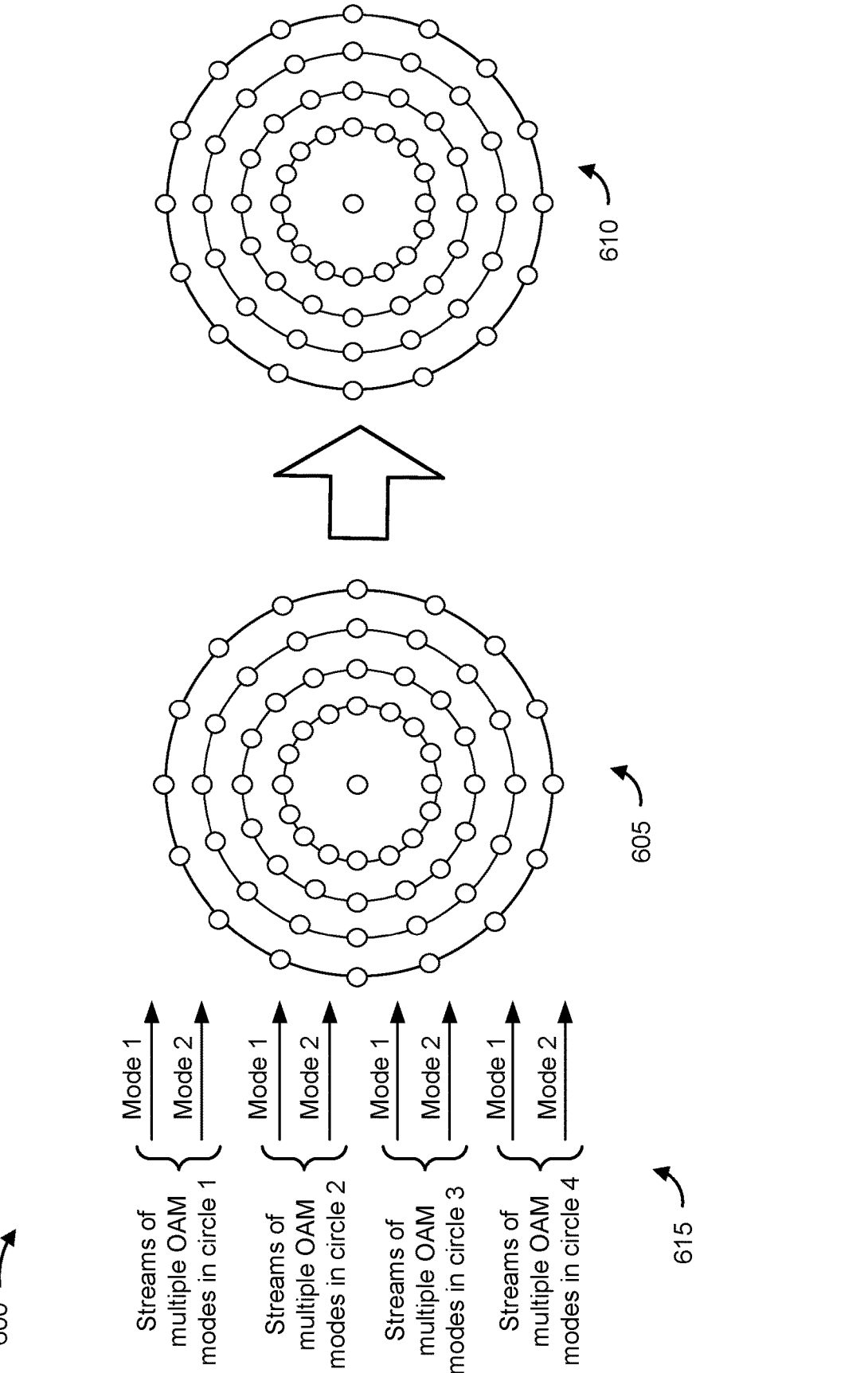
FIGS. 6 and 7 are diagrams illustrating examples associated with co-axial multi-circle OAM multiplexing based communication, in accordance with various aspects of the present disclosure.

FIG. 6 is a diagram illustrating an example 600 associated with co-axial multi-circle OAM multiplexing based communication, in accordance with various aspects of the present disclosure. The multi-circle OAM multiplexing based communication may refer to communication between a transmitter 605 and a receiver 610. Multiple co-axial UCA antenna circles and/or multiple co-axial SPP-based apertures may be implemented at the transmitter 605 and the receiver 610.

As shown by reference number 615, a number of data streams of different OAM azimuth modes may be transmitted using each circle of the multi-circle transmitter 605. For example, as shown, a first data stream of each circle may be transmitted using a first OAM azimuth mode ("Azimuth Mode 1"), and a second data stream of each circle may be transmitted using a second OAM azimuth mode ("Azimuth Mode 2"). In some aspects, the intra-circle streams may be orthogonal. The inter-circle streams may be orthogonal with different OAM azimuth modes or non-orthogonal with the same OAM azimuth mode. For each OAM azimuth mode, there may be inter-circle interferences. For example, a stream transmitted from one circle using Azimuth Mode 1 may be mutually interfered with a stream transmitted from another circle using Azimuth Mode 1.

For a co-axial multi-circle OAM-based communication system, the channel gains of streams from each circle may be different for each OAM azimuth mode. For example, for a certain set of system parameters (including, for example, communication distance, radiuses of each transmitter circle, radiuses of each receiver circle, carrier frequency, and/or number of antennas in a circle): for OAM azimuth mode −2 and 2, a transmitter circle with radius=0.8 meters may have the largest channel gain; for OAM azimuth mode −1 and 1, the transmitter circle with radius=0.6 meters may have the largest channel gain; and for OAM azimuth mode 0, the transmitter circle with radius=0.2 meters may have the largest channel gain. Therefore, to achieve the highest data throughput, mode selection can be used to select an azimuth mode for each transmitter circle that corresponds to an optimal transmitter circle.

Based on the theory of Green function (waveform from a single point source with the same boundary condition), the relevant Maxwell equations, or Helmholtz equation as their scalar equivalence in our OAM setup, can be solved in an integral form, which is the equivalent to Huygens-Fresnel principle. The signal at receiver plane v can be written as a function of transmitter signal u as $$v = \int\int u \frac{\exp(jkr)}{r} \psi dS$$

where $\psi=\cos\theta$ or some other function of the angle of propagation close to $\cos\theta$. In the current problem, $\psi\approx1$. Using simulation, for example, eigen modes can be found using singular value decomposition (SVD) of the transfer matrix.

As indicated above, FIG. 6 is provided as an example. Other examples may differ from what is described with regard to FIG. 6.

Figure 7:
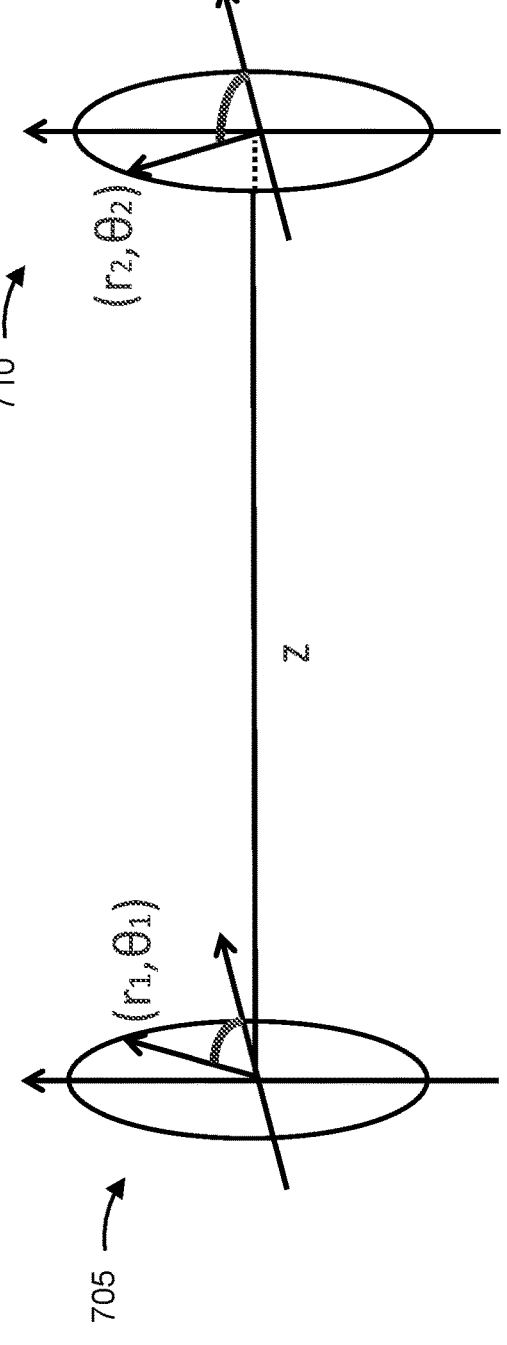

FIG. 7 is a diagram illustrating an example 700 associated with mode selection, in accordance with the present disclosure. The example 700 includes a conceptual representation of an OAM transmitter 705 that communicates with an OAM receiver 710. In some aspects, mode selection may be performed by determining a solution to the Maxwell/Helmholtz equations indicated above.

In some aspects, for example, an integral solution with discreet angular sampling may be used. To perform the discreet angular sampling method in an implementation with N transmitter antennas and N receiver antennas, the transfer matrix H can be found as (ignoring the cosine factor in the amplitude in Huygens-Fresnel formula):

$$H_{m,n} \propto \frac{\exp\left(jk\sqrt{z^2 + (r_1\cos\theta_1 - r_2\cos\theta_2)^2 + (r_1\sin\theta_1 - r_2\sin\theta_2)^2}\right)}{\sqrt{z^2 + (r_1\cos\theta_1 - r_2\cos\theta_2)^2 + (r_1\sin\theta_l - r_2\sin\theta_2)^2}} =$$

$$\frac{\exp\left\{jk\sqrt{z^2 + r_1^2 + r_2^2 - 2r_1r_2\cos(\theta_1 - \theta_2)}\right\}}{\sqrt{z^2 + r_1^2 + r_2^2 - 2r_1r_2\cos(\theta_1 - \theta_2)}}.$$

As shown, the transmitter plane and receiver plane are vertical to a z-axis. The transmitter antenna 705 and/or receiver antenna 710 can have angular offset.

It may be noted that H is cyclic, which implies that its eigenvectors are discrete Fourier transform (DFT) vectors:

$$v_\mu = \exp\left\{j\frac{2\pi\mu\nu}{N}\right\}, \mu = 0, 1, \ldots (N-1), \nu = 0, 1, \ldots . (N-1),$$

where $\mu$ is the vector index of DFT vector and $\nu$ is the element index in each DFT vector. In this representation, the $\nu$-th DFT vector corresponds to the $\mu$-th OAM waveform. In some cases, with N transmitters and N receivers per circle, all OAM modes with azimuth order $<=N$ are orthogonal. However, with N transmitter and receiver antennas, OAM azimuth modes of order N or higher are not orthogonal at the receiver 710.

The DFT/azimuth mode strength (approximate result per circle pair) can be determined using Taylor expansion approximations:

$$\sqrt{z^2 + r_1^2 + r_2^2 - 2r_1r_2\cos(\theta_1 - \theta_2)} =$$

$$z\sqrt{1 + \frac{r_1^2 + r_2^2 - 2r_1r_2\cos(\theta_1 - \theta_2)}{z^2}} \approx z\left(1 + \frac{r_1^2 + r_2^2 - 2r_1r_2\cos(\theta_1 - \theta_2)}{2z^2}\right) =$$

$$z + \frac{r_1^2 + r_2^2}{2z} - \frac{r_1r_2\cos(\theta_1 - \theta_2)}{z}.$$

Then:

$$H_{m,n} \propto \frac{\exp\left\{jk\sqrt{z^2 + r_1^2 + r_2^2 - 2r_1r_2\cos(\theta_1 - \theta_2)}\right\}}{\sqrt{z^2 + r_1^2 + r_2^2 - 2r_1r_2\cos(\theta_1 - \theta_2)}} \approx$$

$$\frac{\exp\left\{jkz\sqrt{1 + \frac{r_1^2 + r_2^2 - 2r_1r_2\cos(\theta_1 - \theta_2)}{z^2}}\right\}}{z + \frac{r_1^2 + r_2^2}{2z} - \frac{2r_1r_2\cos(\theta_1 - \theta_2)}{z}} \approx$$

$$\frac{\exp\left\{jk\left(z + \frac{r_1^2 + r_2^2}{2z}\right)\right\}}{z}\exp\left\{\frac{-jkr_1r_2\cos(\theta_1 - \theta_2)}{z}\right\}.$$

Without losing generality, assuming $\theta_1=0$, $\theta_2=0$, ignoring all common terms among receiver antennas:

$$H_{m,n} \propto \exp\left\{\frac{-jkr_1r_2\cos\theta}{z}\right\} = \exp\left\{-j2\pi\frac{r_1r_2}{\lambda z}\cos\theta\right\},$$

where $\theta=0, 2\pi/N, \ldots, 2(N-1)\,\pi/N$, and wherein the critical term is exp $$\left\{-j2\pi\frac{r_1r_2}{\lambda z}\cos\theta\right\}$$

and a row vector is exp $$\left\{-j2\pi\frac{r_1r_2}{\lambda z}\cos\frac{2\pi p}{N}\right\},$$

$p=0,1, \ldots (N-1)$.

It is known that $\int_0^\pi e^{i\beta\,\cos\,x}\cos nx\,dx=i^n\pi J_n(\beta)$ and, therefore, $\int_{-\pi}^\pi e^{i\beta\,\cos\,x}\sin nx\,dx=0$, because $\sin nx$ is odd. In addition, $\int_{-\pi}^\pi e^{i\beta\,\cos x}\cos nx\,dx=i^n2\pi d$. It follows that the n-th eigenvalue of H is $$\frac{1}{\sqrt{N}}\sum_{p=0}^{N-1}\exp\left\{-j\frac{2\pi pn}{N}\right\}\exp\left\{-j2\pi\frac{r_1r_2}{\lambda z}\cos\frac{2\pi p}{N}\right\} =$$

$$\frac{1}{\sqrt{N}}\frac{N}{2\pi}\sum_{p=0}^{N-1}\exp\left\{-jnp\frac{2\pi}{N}\right\}\exp\left\{-j2\pi\frac{r_1r_2}{\lambda z}\cos\frac{2\pi p}{N}\right\}\frac{2\pi}{N} =$$

$$\frac{\sqrt{N}}{2\pi}\sum_{p=0}^{N-1}\exp\left\{-jn\frac{2\pi p}{N}\right\}\exp\left\{-j2\pi\frac{r_1r_2}{\lambda z}\cos\frac{2\pi p}{N}\right\}\frac{2\pi}{N} \propto$$

$$\frac{\sqrt{N}}{2\pi}\int_{-\pi}^\pi\exp\left\{-j2\pi\frac{r_1r_2}{\lambda z}\cos\theta\right\}\exp\{-jn\theta\}d\theta \propto \sqrt{N}J_n\left(\frac{2\pi r_1r_2}{\lambda z}\right),$$

where $$\frac{1}{\sqrt{N}}$$

is based on a unitary energy regardless of N; the $\sqrt{N}$ in the end indicates an array gain.

Additionally, it has be determined, for example based on experimental data, that a larger radius results in higher OAM multiplexing degree and higher sum throughput. It also has been determined that a higher frequency typically results in a higher OAM multiplexing degree and lower sum throughput. In some parameter settings (e.g. large radius, high frequency), the number of used OAM modes can be as large as multiple tens. As such, mode selection may lead to complexity and unnecessary power consumption by transmitters, which may have a negative impact on the efficiency of receivers and/or transmitters.

Aspects of the techniques and apparatuses described herein may provide an approach that involves a low-complexity mechanism for azimuth mode selection and activation. In some aspects, a transmitter of OAM multiplexing based communications may determine an azimuth mode configuration for transmitting a data stream and transmit, to a receiver of the OAM multiplexing based communication, the data stream based at least in part on the azimuth mode configuration. The receiver may provide feedback in accordance with a bit function that minimizes the number of bits used to indicate the feedback. In this way, aspects may facilitate azimuth mode selection and activation, without unnecessary data transfer. As a result, aspects may facilitate increases in throughput, signal reliability, signal quality, and/or the like without unnecessary increases in system complexity and/or power consumption.

As indicated above, FIG. 7 is provided as an example. Other examples may differ from what is described with regard to FIG. 7.

Figure 8:
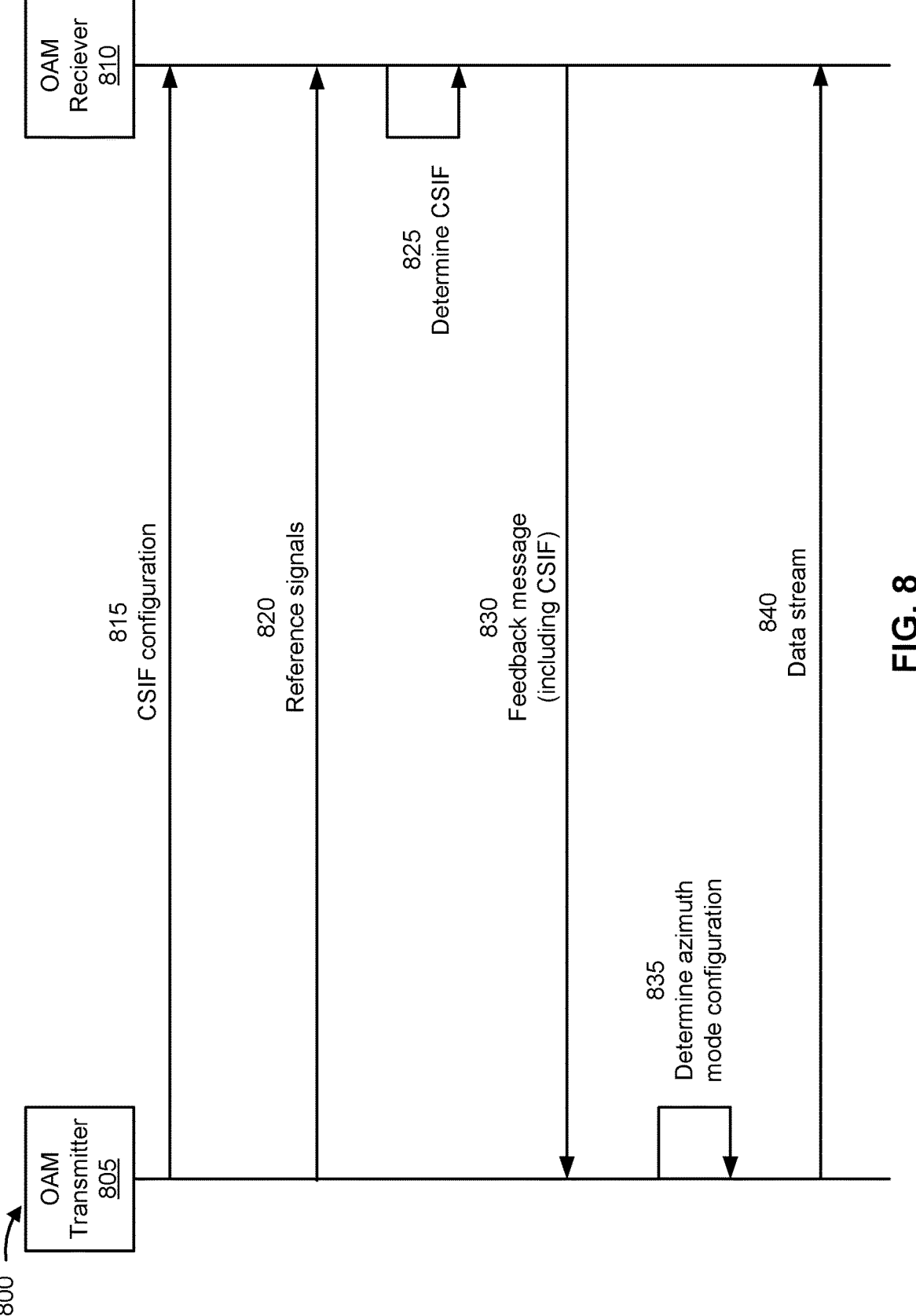
FIG. 8 is a diagram illustrating an example associated with azimuth mode configurations for OAM multiplexing based communication, in accordance with the present disclosure.

FIG. 8 is a diagram illustrating an example 800 associated with azimuth mode configurations for OAM multiplexing based communication, in accordance with the present disclosure. As shown in FIG. 8, a transmitter for OAM multiplexing based communication (shown as OAM transmitter 805) and a receiver for OAM multiplexing based communication (shown as OAM receiver 810) may communicate with one another.

As shown by reference number 815, the OAM transmitter 805 may transmit, and the OAM receiver 810 may receive, a circle selection information feedback (CSIF) configuration. The CSIF configuration may include an indication to feedback CSIF to the OAM transmitter 805. For example, the CSIF may indicate a selection of one or more modes (e.g., azimuth modes and/or radial modes) to be used to transmit a data stream to the OAM receiver 810, a selection of one or more transmitter circles to be used to transmit the data stream, and/or one or more transmission parameters to be used in transmitting the data stream, among other examples. For example, the CSIF may indicate the relation of the selection of one or more modes and the selection of one or more transmitter circles. For example, the CSIF may indicate which of the selected transmitter circles is used for each OAM mode.

In some aspects, the CSIF configuration may include at least one of a list of one or more candidate transmitter circles or an indication that a candidate transmitter circle of the one or more candidate transmitter circles includes a central transmitter antenna. In some aspects, the CSIF configuration may include a representation configuration that indicates at least one bit function for determining a number of bits to use to indicate a set of selected transmitter circles. In some aspects, the representation configuration may indicate multiple bit functions and/or a selection of one of the multiple bit functions. For example, in some aspects, the representation configuration may include a first bit function and a second bit function, and the representation configuration (or a subsequent message transmitted by the OAM transmitter 805) may include an indication to use the first bit function, the second bit function, or the bit function of the first bit function and the second bit function that indicates a smallest number of bits to use to indicate the set of selected transmitter circles.

In some aspects, the representation configuration may indicate a configuration of representation bits for efficiently transmitting feedback information to the OAM transmitter 805. The representation bits may be divided into two parts. The first part may include a representation of a total list of selected transmission circles, and the second part may include a representation of which of the selected transmission circles is to be used for each OAM mode. An OAM mode may include an azimuth mode and/or a radial mode.

For example, the OAM transmitter 805 may indicate, via the CSIF configuration, a configuration of M candidate transmitter circles (sorted from inner to outer with index from small to large) and N used OAM modes. The transmitter circles and/or the used OAM modes may be configured by the transmitter 805, the receiver 810, and/or a base station.

In some aspects, the representation of the total list of selected transmission circles may be indicated using a bit function that may include a logarithmic function of a number of selected transmitter circles and a number of candidate transmitter circles. For example, if the selected transmitter circles (not including a central transmitter antenna) are denoted as M', $1 \leq M' \leq min$ (M, N), then, $\lceil \log_2(min(M, N)) \rceil$ bits may be used to express the value of M', and $\lceil \log_2 C_M^{M'} \rceil$ bits may be used to indicate the transmitter circles that are selected, where $C_M^{M'}$ means the number of possibilities of selecting M' azimuth modes from M azimuth modes. For example, the transmitter circles may be denoted as "Tx circle 0, Tx circle 1, . . . , Tx circle M−1" based on radius from the smallest radius to the largest radius. In this way, a data field may be configured to include an indication of the index (0, 1, . . . , M−1) of each selected transmitter circle.

In some aspects, a bit function may indicate that the number of bits to use to indicate the set of selected transmitter circles is equal to a number of candidate transmitter circles. In some aspects, one bit may be used to indicate the selection status of each candidate transmitter circle. For example, for each candidate transmitter circle, one bit may indicate whether the candidate transmitter circle is selected or not selected. In this way, M bits may be used for all candidate transmitter circles.

As indicated above, the CSIF configuration may include an indication that a candidate transmitter circle of the one or more candidate transmitter circles includes a central transmitter antenna. Thus, if there is a central transmitter antenna at a transmission plane, the OAM receiver 810 may be configured to refrain from feeding back the transmitter circle selected to be used for OAM azimuth mode 0. If there is not a central antenna at a transmission plane, the OAM receiver 810 may feed back the transmitter circle selected to be used for OAM azimuth mode 0.

The second part of the representation may indicate which of the selected transmitter circles is used for each OAM mode. This part of representation may be based on a property that if the maximum channel gain of OAM azimuth mode n is obtained when using transmitter circle m, then the maximum channel gain of OAM azimuth mode n+1 is obtained only when using transmitter circle m'≥m. This means, if transmitter circle m is selected for OAM azimuth mode n, then OAM azimuth mode n+1 can only select a transmitter circle having a radius that is not smaller than a radius of transmitter circle m.

In some aspects, for example, instances of a relation between the selected transmitter circles and the used OAM azimuth modes may be expressed by making a queue of all the N used OAM azimuth modes based on the azimuth mode indexes from small to large and cutting the queue (with N−1 possible cutting positions) into M' segments (e.g., cutting M'−1 times), where each segment corresponds to one transmitter circle, with the transmitter circle indexes sorted from small to large. There may be a total of $C_{N-1}^{M'-1}$ kind of cutting possibilities. Thus, given the value of M', the number of bits to express the selection of one cutting possibility may be $\lceil \log_2 C_{N-1}^{M'-1} \rceil$. Accordingly, in some aspects, the number of actual representation bits may be $min\{\lceil \log_2(min(M, N)) \rceil + \lceil \log_2 C_M^{M'} \rceil, M\} + \lceil \log_2 C_{N-1}^{M'-1} \rceil$, and the number of reserved (maximum) representation bits may be min $$\left\{ \lceil \log 2(min(M, N)) \rceil + \max_{1 \leq M' \leq min(M,N)} \left( \lceil \log_2 C_M^{M'} \rceil + \lceil \log_2 C_{N-1}^{M'-1} \rceil \right), \right.$$

$$\left. M + \max_{1 \leq M' \leq min(M,N)} \left( \lceil \log_2 C_{N-1}^{M'-1} \rceil \right) \right\}.$$

In this way, some aspects provide for using a smaller number of representation bits to transmit feedback than some other cases in which, for example, each used OAM azimuth mode can be associate with any transmitter circle, resulting in a number of representation bits of $N\lceil \log_2(M)\rceil$.

As shown by reference number 820, the OAM transmitter 805 may transmit, and the OAM receiver 810 may receive, one or more reference signals. As shown by reference number 825, the OAM receiver 810 may determine the CSIF. As shown by reference number 830, the OAM receiver 810 may transmit, and the OAM transmitter 805 may receive, a feedback message. The feedback message may include beamforming information. In some aspects, the beamforming information may indicate a maximum azimuth mode order. In some aspects, the beamforming information may indicate the CSIF.

In some aspects, the feedback message may be received based at least in part on an open-loop feedback configuration. For example, one or multiple circles may be used for each particular azimuth mode and this may be determined in an open-loop fashion since a higher azimuth mode typically involves a larger radius circle so that circles with increasing radius are used for higher azimuth modes. A single circle may be selected for each azimuth mode with additional feedback and/or multiple circles may be selected for each azimuth mode with additional feedback.

In some aspects, the feedback (and/or the CSIF) may be transmitted in one message or multiple messages. For example, in some aspects, the receiver OAM 810 may transmit, and the OAM transmitter 805 may receive, a first feedback message that includes a first portion of the OAM mode relationship information and a second feedback message that includes a second portion of the OAM mode relationship information.

For example, in aspects in which the feedback is transmitted in one message, since the OAM transmitter 805 does not know the value of M' before decoding the message, the amount of the reserved radio resource for transmitting this message may correspond to the possible maximum number of bits, e.g., $$\lceil \log_2(\min(M,\ N))\rceil +$$

$$\max_{1\leq M'\leq min(M,N)}\left(\lceil\log_2 C_M^{M'}\rceil + \lceil\log_2 C_{N-1}^{M'-1}\rceil\right) \text{ or } M + \max_{1\leq M'\leq min(M,N)}\left(\lceil\log_2 C_{N-1}^{M'-1}\rceil\right).$$

In aspects in which multiple messages are used for transmitting feedback, a first CSIF message may include $\lceil \log_2 (\min (M, N))\rceil$ bits or M bits depending on the representation configuration. Thus, for example, the second CSIF message may include $\lceil\log_2 C_M^{M'}\rceil + \lceil\log_2 C_{N-1}^{M'-1}\rceil$ bits or $\lceil\log_2 C_{N-1}^{M'-1}\rceil$ bits, depending on the representation configuration. Because the OAM transmitter 805 already knows the value of M' by decoding the first CSIF message, the OAM transmitter 805 can know the number of bits and the corresponding radio resource amount of the second CSIF message.

As shown by reference number 835, the OAM transmitter 805 may determine an azimuth mode configuration for transmitting a data stream. The azimuth mode configuration may indicate one or more OAM azimuth modes. For example, the azimuth mode configuration may indicate a set of beamforming weights for use in generating a set of OAM waveforms (OAM modes) corresponding to a particular set of azimuth mode orders. In some aspects, the azimuth mode configuration may indicate a set of azimuth mode orders to be used in generating a set of OAM modes, a sequence according to which the azimuth mode orders are to be used, and/or one or more criteria to be used to determine when to use azimuth mode orders of the set of azimuth mode orders. In some aspects, the OAM transmitter 805 may determine the azimuth mode configuration based at least in part on the CSIF.

In some aspects, determining the azimuth mode configuration may include determining that the number of azimuth modes in the one or more azimuth modes is one, in which case, the OAM transmitter 805 may activate a center antenna of the transmitter circle based at least in part on determining that the number of azimuth modes in the one or more azimuth modes is one. For example, if the only mode to be used is azimuth mode 0, the OAM transmitter 805 may only activate one transmitter for each selected transmitter circle.

In some aspects, the OAM transmitter 805 (and/or the OAM receiver 810) may determine the azimuth mode configuration based at least in part on an azimuth mode order sequence scheme that indicates a sequential increase in values of an azimuth mode order index. For example, the azimuth mode order index may be associated with a sequential increase of OAM azimuth order. Starting from azimuth mode 0, if only azimuth mode 0 is selected, only the center antenna is needed. In some aspects, the azimuth mode 0 may be used immediately after random access or connection establishment. In some aspects, the sequence scheme may include sequentially increasing the order of azimuth modes and, for each next higher azimuth mode index, adding one more active transmitter/receiver antenna to each circle involved. In some aspects, a difference between a first value of the azimuth mode order index and a second value of the azimuth mode order index may be a power of two.

In some aspects, the OAM transmitter 805 may perform analog beamforming to establish the plurality of azimuth mode orders. Analog beamforming may be used for the multiple azimuth order since the phase difference between adjacent units on a circle may be pre-determined. In some aspects, the OAM transmitter 805 may further determine a radial mode configuration for transmitting the data stream. The radial mode configuration may indicate a set of beamforming weights for use in generating a set of OAM waveforms (OAM modes) corresponding to a particular set of radial mode orders. In some aspects, the radial mode configuration may indicate a set of radial mode orders to be used in generating a set of OAM modes, a sequence according to which the radial mode orders are to be used, and/or one or more criteria to be used to determine when to use radial mode orders of the set of radial mode orders.

As shown by reference number 840, the OAM transmitter 805 may transmit, and the OAM receiver 810 may receive, a data stream. The OAM transmitter 805 may transmit the data stream based at least in part on the azimuth mode configuration. In some aspects, the OAM transmitter 805 may activate a set of transmitter antennas based at least in part on the azimuth mode configuration and/or the radial mode configuration.

In some aspects, the set of transmitter antennas may be arranged on the transmitter circle such that a first angular offset corresponding to a first pair of transmitter antennas equals a second angular offset corresponding to a second pair of transmitter antennas. In some aspects, all the antennas may be arranged on the circle with equal angular offset. In some aspects, a number of transmitter antennas in the set of transmitter antennas is greater than or equal to a number of azimuth modes in the one or more azimuth modes, and the one or more azimuth modes may be mutually orthogonal.

In some aspects, the number of transmitter antennas in the set of transmitter antennas may equal the number of azimuth modes in the one or more azimuth modes. In some aspects, if only the first N azimuth modes (0, 1, 2, . . . N–1) are desired, a transmitter circle may include only N transmitter antennas. Similarly, a receiver circle may include only N receiver antennas. This configuration may provide a reduction in complexity and power.

As indicated above, FIG. 8 is provided as an example. Other examples may differ from what is described with respect to FIG. 8.

Figure 9:
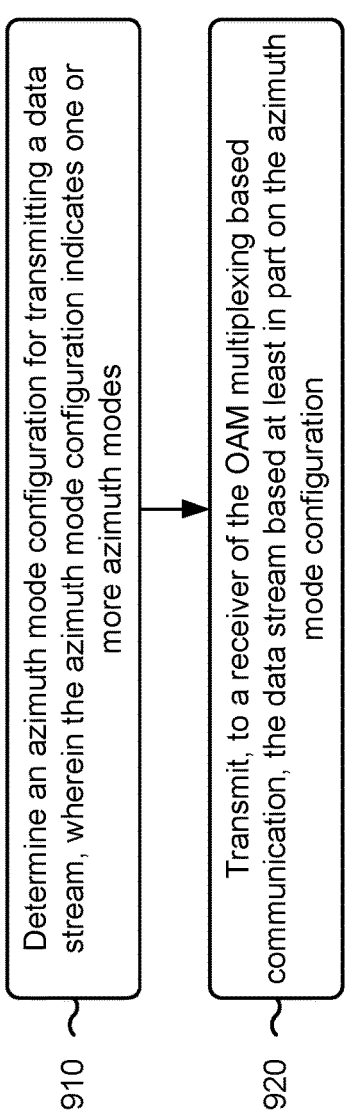
FIGS. 9 and 10 are diagrams illustrating example processes associated with azimuth mode configurations for OAM multiplexing based communication, in accordance with the present disclosure.

FIG. 9 is a diagram illustrating an example process 900 performed, for example, by a transmitter of OAM multiplexing based communication, in accordance with the present disclosure. Example process 900 is an example where the transmitter (e.g., transmitter 805) performs operations associated with azimuth mode configurations for OAM multiplexing based communication.

As shown in FIG. 9, in some aspects, process 900 may include determining an azimuth mode configuration for transmitting a data stream, wherein the azimuth mode configuration indicates one or more azimuth modes (block 910). For example, the transmitter (e.g., using communication manager 1108 and/or determination component 1110, depicted in FIG. 11) may determine an azimuth mode configuration for transmitting a data stream, wherein the azimuth mode configuration indicates one or more azimuth modes, as described above.

As further shown in FIG. 9, in some aspects, process 900 may include transmitting, to a receiver of the OAM multiplexing based communication, the data stream based at least in part on the azimuth mode configuration (block 920). For example, the transmitter (e.g., using communication manager 1108 and/or transmission component 1104, depicted in FIG. 11) may transmit, to a receiver of the OAM multiplexing based communication, the data stream based at least in part on the azimuth mode configuration, as described above.

Process 900 may include additional aspects, such as any single aspect or any combination of aspects described below and/or in connection with one or more other processes described elsewhere herein.

In a first aspect, process 900 includes activating, based at least in part on the azimuth mode configuration, a set of transmitter antennas associated with a transmitter circle.

In a second aspect, alone or in combination with the first aspect, the set of transmitter antennas are arranged on the transmitter circle such that a first angular offset corresponding to a first pair of transmitter antennas equals a second angular offset corresponding to a second pair of transmitter antennas.

In a third aspect, alone or in combination with one or more of the first and second aspects, a number of transmitter antennas in the set of transmitter antennas is greater than or equal to a number of azimuth modes in the one or more azimuth modes, and wherein the one or more azimuth modes are mutually orthogonal.

In a fourth aspect, alone or in combination with the third aspect, the number of transmitter antennas in the set of transmitter antennas equals the number of azimuth modes in the one or more azimuth modes.

In a fifth aspect, alone or in combination with the fourth aspect, determining the azimuth mode configuration comprises determining that the number of azimuth modes in the one or more azimuth modes is one, and wherein activating the set of transmitter antennas comprises activating a center antenna of the transmitter circle based at least in part on determining that the number of azimuth modes in the one or more azimuth modes is one.

In a sixth aspect, alone or in combination with one or more of the first through fifth aspects, process 900 includes activating, based at least in part on the azimuth mode configuration, an additional set of transmitter antennas associated with an additional transmitter circle.

In a seventh aspect, alone or in combination with the sixth aspect, a number of transmitter antennas in the additional set of transmitter antennas equals a number of transmitter antennas in the set of transmitter antennas.

In an eighth aspect, alone or in combination with one or more of the first through seventh aspects, process 900 includes determining a radial mode configuration for transmitting the data stream, wherein the radial mode configuration indicates one or more radial modes, and wherein activating the set of transmitter antennas is further based at least in part on the radial mode configuration.

In a ninth aspect, alone or in combination with one or more of the first through eighth aspects, determining the azimuth mode configuration comprises determining the azimuth mode configuration based at least in part on an azimuth mode order sequence scheme that indicates a sequential increase in values of an azimuth mode order index.

In a tenth aspect, alone or in combination with the ninth aspect, a difference between a first value of the azimuth mode order index and a second value of the azimuth mode order index is a power of two.

In an eleventh aspect, alone or in combination with one or more of the ninth through tenth aspects, the azimuth mode configuration indicates a plurality of azimuth mode orders, and wherein the method further comprises performing analog beamforming to establish the plurality of azimuth mode orders.

In a twelfth aspect, alone or in combination with one or more of the first through eleventh aspects, process 900 includes receiving, from the receiver, a feedback message comprising beamforming information that indicates a maximum azimuth mode order.

In a thirteenth aspect, alone or in combination with the twelfth aspect, receiving the feedback message comprises receiving the feedback message based at least in part on an open-loop feedback configuration.

In a fourteenth aspect, alone or in combination with one or more of the first through thirteenth aspects, process 900 includes transmitting, to the receiver, a CSIF configuration.

In a fifteenth aspect, alone or in combination with the fourteenth aspect, the CSIF configuration comprises a representation configuration that indicates at least one bit function for determining a number of bits to use to indicate a set of selected transmitter circles.

In a sixteenth aspect, alone or in combination with the fifteenth aspect, the at least one bit function comprises a logarithmic function of a number of selected transmitter circles and a number of candidate transmitter circles.

In a seventeenth aspect, alone or in combination with the fifteenth aspect, the at least one bit function indicates that the number of bits to use to indicate the set of selected transmitter circles is equal to a number of candidate transmitter circles.

In an eighteenth aspect, alone or in combination the fifteenth aspect, the at least one bit function comprises a first bit function and a second bit function, and wherein the representation configuration comprises an indication to use the first bit function, the second bit function, or the bit function of the first bit function and the second bit function that indicates a smallest number of bits to use to indicate the set of selected transmitter circles.

In a nineteenth aspect, alone or in combination with one or more of the fourteenth through eighteenth aspects, the CSIF configuration includes at least one of a list of one or more candidate transmitter circles, or an indication that a candidate transmitter circle of the one or more candidate transmitter circles includes a central transmitter antenna.

In a twentieth aspect, alone or in combination with one or more of the fourteenth through nineteenth aspects, process 900 includes receiving, from the receiver, CSIF based at least in part on the CSIF configuration.

In a twenty-first aspect, alone or in combination with the twentieth aspect, the CSIF comprises an indication of a set of selected transmitter circles of the one or more candidate transmitter circles.

In a twenty-second aspect, alone or in combination with the twenty-first aspect, a selected transmitter circle comprises a central antenna, and wherein the indication of the set of selected transmitter circles does not indicate a circle selection corresponding to an OAM azimuth mode zero based at least in part on a determination that the selected transmitter circle comprises a central antenna.

In a twenty-third aspect, alone or in combination with the twenty-first aspect, a selected transmitter circle does not include a central antenna, and wherein the indication of the set of selected transmitter circles indicates a circle selection corresponding to an OAM azimuth mode zero based at least in part on a determination that the selected transmitter circle does not include a central antenna.

In a twenty-fourth aspect, alone or in combination with one or more of the twenty-first through twenty-third aspects, the CSIF comprises OAM mode relationship information that indicates one or more OAM modes corresponding to one or more selected transmitter circles of the set of selected transmitter circles.

In a twenty-fifth aspect, alone or in combination with the twenty-fourth aspect, receiving the CSIF comprises receiving a first feedback message that includes a first portion of the OAM mode relationship information, and receiving a second feedback message that includes a second portion of the OAM mode relationship information.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
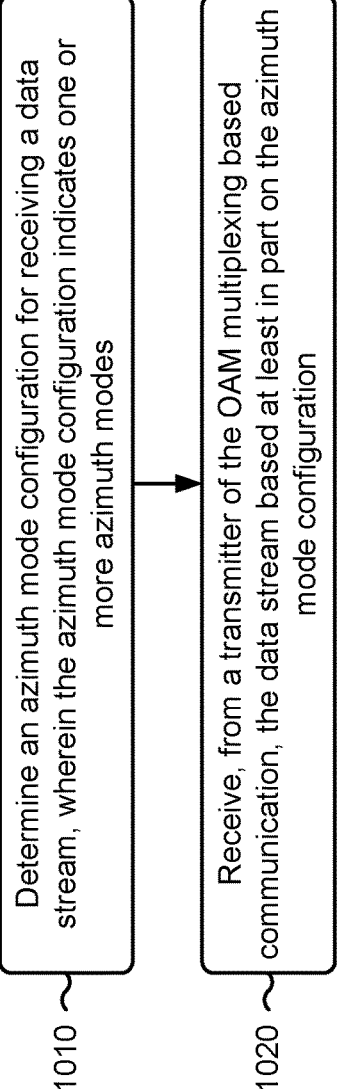

FIG. 10 is a diagram illustrating an example process 1000 performed, for example, by a receiver of OAM multiplexing based communication, in accordance with the present disclosure. Example process 1000 is an example where the receiver (e.g., receiver 810) performs operations associated with azimuth mode configurations for OAM multiplexing based communication.

As shown in FIG. 10, in some aspects, process 1000 may include determining an azimuth mode configuration for receiving a data stream, wherein the azimuth mode configuration indicates one or more azimuth modes (block 1010). For example, the receiver (e.g., using communication manager 1208 and/or determination component 1210, depicted in FIG. 12) may determine an azimuth mode configuration for receiving a data stream, wherein the azimuth mode configuration indicates one or more azimuth modes, as described above.

As further shown in FIG. 10, in some aspects, process 1000 may include receiving, from a transmitter of the OAM multiplexing based communication, the data stream based at least in part on the azimuth mode configuration (block 1020). For example, the receiver (e.g., using communication manager 1208 and/or reception component 1202, depicted in FIG. 12) may receive, from a transmitter of the OAM multiplexing based communication, the data stream based at least in part on the azimuth mode configuration, as described above.

Process 1000 may include additional aspects, such as any single aspect or any combination of aspects described below and/or in connection with one or more other processes described elsewhere herein.

In a first aspect, process 1000 includes activating, based at least in part on the azimuth mode configuration, a set of receiver antennas associated with a receiver circle.

In a second aspect, alone or in combination with the first aspect, the set of receiver antennas are arranged on the receiving circle such that a first angular offset corresponding to a first pair of receiver antennas equals a second angular offset corresponding to a second pair of receiver antennas.

In a third aspect, alone or in combination with one or more of the first and second aspects, a number of receiver antennas in the set of receiver antennas is greater than or equal to a number of azimuth modes in the one or more azimuth modes, and wherein the one or more azimuth modes are mutually orthogonal.

In a fourth aspect, alone or in combination with the third aspect, the number of receiver antennas in the set of receiver antennas equals the number of azimuth modes in the one or more azimuth modes.

In a fifth aspect, alone or in combination with the fourth aspect, determining the azimuth mode configuration comprises determining that the number of azimuth modes in the one or more azimuth modes is one, and wherein activating the set of receiver antennas comprises activating a center antenna of the receiver circle based at least in part on determining that the number of azimuth modes in the one or more azimuth modes is one.

In a sixth aspect, alone or in combination with one or more of the first through fifth aspects, process 1000 includes activating, based at least in part on the azimuth mode configuration, an additional set of receiver antennas associated with an additional receiver circle.

In a seventh aspect, alone or in combination with the sixth aspect, a number of receiver antennas in the additional set of receiver antennas equals a number of receiver antennas in the set of receiver antennas.

In an eighth aspect, alone or in combination with one or more of the first through seventh aspects, process 1000 includes determining a radial mode configuration for receiver the data stream, wherein the radial mode configuration indicates one or more radial modes, and wherein activating the set of receiver antennas is further based at least in part on the radial mode configuration.

In a ninth aspect, alone or in combination with one or more of the first through eighth aspects, determining the azimuth mode configuration comprises determining the azimuth mode configuration based at least in part on an azimuth mode order sequence scheme that indicates a sequential increase in values of an azimuth mode order index.

In a tenth aspect, alone or in combination with the ninth aspect, a difference between a first value of the azimuth mode order index and a second value of the azimuth mode order index is a power of two.

In an eleventh aspect, alone or in combination with one or more of the ninth through tenth aspects, the azimuth mode configuration indicates a plurality of azimuth mode orders, and wherein the method further comprises performing analog beamforming to establish the plurality of azimuth mode orders.

In a twelfth aspect, alone or in combination with one or more of the first through eleventh aspects, process 1000 includes transmitting, to the transmitter, a feedback message comprising beamforming information that indicates a maximum azimuth mode order.

In a thirteenth aspect, alone or in combination with the twelfth aspect, transmitting the feedback message comprises transmitting the feedback message based at least in part on an open-loop feedback configuration.

In a fourteenth aspect, alone or in combination with one or more of the first through thirteenth aspects, process 1000 includes receiving, from the transmitter, a CSIF configuration.

In a fifteenth aspect, alone or in combination with the fourteenth aspect, the CSIF configuration comprises a representation configuration that indicates at least one bit function for determining a number of bits to use to indicate a set of selected transmitter circles.

In a sixteenth aspect, alone or in combination with the fifteenth aspect, the at least one bit function comprises a logarithmic function of a number of selected transmitter circles and a number of candidate transmitter circles.

In a seventeenth aspect, alone or in combination with the fifteenth aspect, the at least one bit function indicates that the number of bits to use to indicate the set of selected transmitter circles is equal to a number of candidate transmitter circles.

In an eighteenth aspect, alone or in combination with the fifteenth aspect, the at least one bit function comprises a first bit function and a second bit function, and wherein the representation configuration comprises an indication to use the first bit function, the second bit function, or the bit function of the first bit function and the second bit function that indicates a smallest number of bits to use to indicate the set of selected transmitter circles.

In a nineteenth aspect, alone or in combination with one or more of the fourteenth through eighteenth aspects, the CSIF configuration includes at least one of a list of one or more candidate transmitter circles, or an indication that a candidate transmitter circle of the one or more candidate transmitter circles includes a central transmitter antenna.

In a twentieth aspect, alone or in combination with one or more of the fourteenth through nineteenth aspects, process 1000 includes transmitting, to the transmitter, CSIF based at least in part on the CSIF configuration.

In a twenty-first aspect, alone or in combination with the twentieth aspect, the CSIF comprises an indication of a set of selected transmitter circles of the one or more candidate transmitter circles.

In a twenty-second aspect, alone or in combination with the twenty-first aspect, a selected transmitter circle comprises a central antenna, and wherein the indication of the set of selected transmitter circles does not indicate a circle selection corresponding to an OAM azimuth mode zero based at least in part on a determination that the selected transmitter circle comprises a central antenna.

In a twenty-third aspect, alone or in combination with the twenty-first aspect, a selected transmitter circle does not include a central antenna, and wherein the indication of the set of selected transmitter circles indicates a circle selection corresponding to an OAM azimuth mode zero based at least in part on a determination that the selected transmitter circle does not include a central antenna.

In a twenty-fourth aspect, alone or in combination with one or more of the twenty-first through twenty-third aspects, the CSIF comprises OAM mode relationship information that indicates one or more OAM modes corresponding to one or more selected transmitter circles of the set of selected transmitter circles.

In a twenty-fifth aspect, alone or in combination with the twenty-fourth aspect, transmitting the CSIF comprises receiving a first feedback message that includes a first portion of the OAM mode relationship information, and receiving a second feedback message that includes a second portion of the OAM mode relationship information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
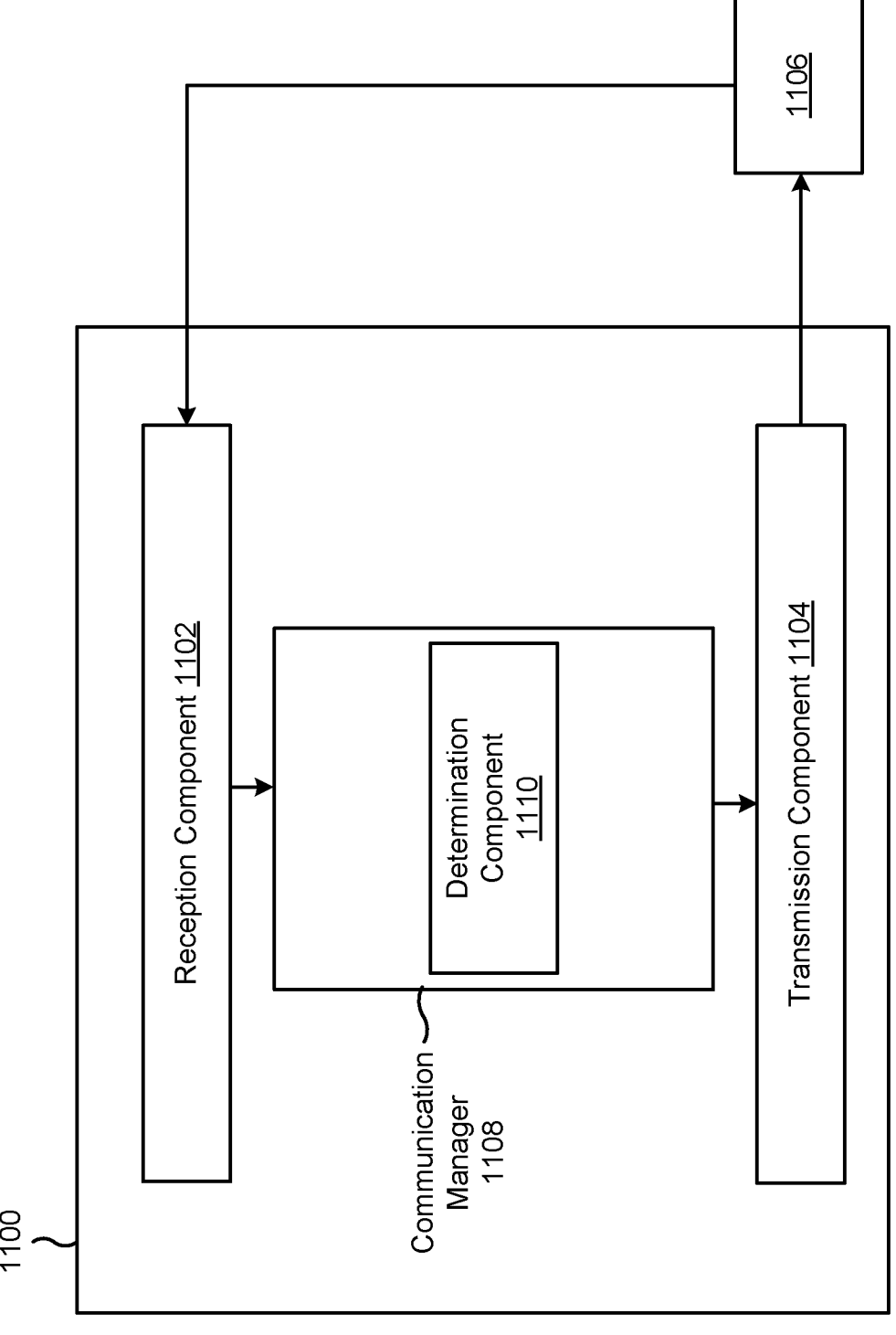
FIGS. 11 and 12 are block diagrams of example apparatuses for wireless communication, in accordance with the present disclosure.

FIG. 11 is a block diagram of an example apparatus 1100 for wireless communication. The apparatus 1100 may be a transmitter, or a transmitter may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 140 or the communication manager 150, shown in FIGS. 1 and 2). The communication manager 1108 may include a determination component 1110.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE and/or the base station described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the UE and/or the base station described in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the UE and/or the base station described in connection with FIG. 2. In some aspects, the transmission component 1104 may be co-located with the reception component 1102 in a transceiver.

The determination component 1110 may determine an azimuth mode configuration for transmitting a data stream, wherein the azimuth mode configuration indicates one or more azimuth modes. In some aspects, the determination component 1110 may include one or more antennas, a modulator, a transmit MIMO processor, a transmit processor, a controller/processor, a memory, or a combination thereof, of the UE and/or the base station described in connection with FIG. 2. In some aspects, the determination component 1110 may include the reception component 1102 and/or the transmission component 1104.

The transmission component 1104 may transmit, to a receiver of the OAM multiplexing based communication, the data stream based at least in part on the azimuth mode configuration. The communication manager 1108 may activate, based at least in part on the azimuth mode configuration, a set of transmitter antennas associated with a transmitter circle. The communication manager 1108 may activate, based at least in part on the azimuth mode configuration, an additional set of transmitter antennas associated with an additional transmitter circle. In some aspects, the communication manager 1108 may include one or more antennas, a modulator, a transmit MIMO processor, a transmit processor, a controller/processor, a memory, or a combination thereof, of the UE and/or the base station described in connection with FIG. 2. In some aspects, the communication manager 1108 may include the reception component 1102, the transmission component 1104, and/or the determination component 1110.

The determination component 1110 may determine a radial mode configuration for transmitting the data stream, wherein the radial mode configuration indicates one or more radial modes wherein activating the set of transmitter antennas is further based at least in part on the radial mode configuration.

The reception component 1102 may receive, from the receiver, a feedback message comprising beamforming information that indicates a maximum azimuth mode order. The transmission component 1104 may transmit, to the receiver, a CSIF configuration. The reception component 1102 may receive, from the receiver, CSIF based at least in part on the CSIF configuration.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
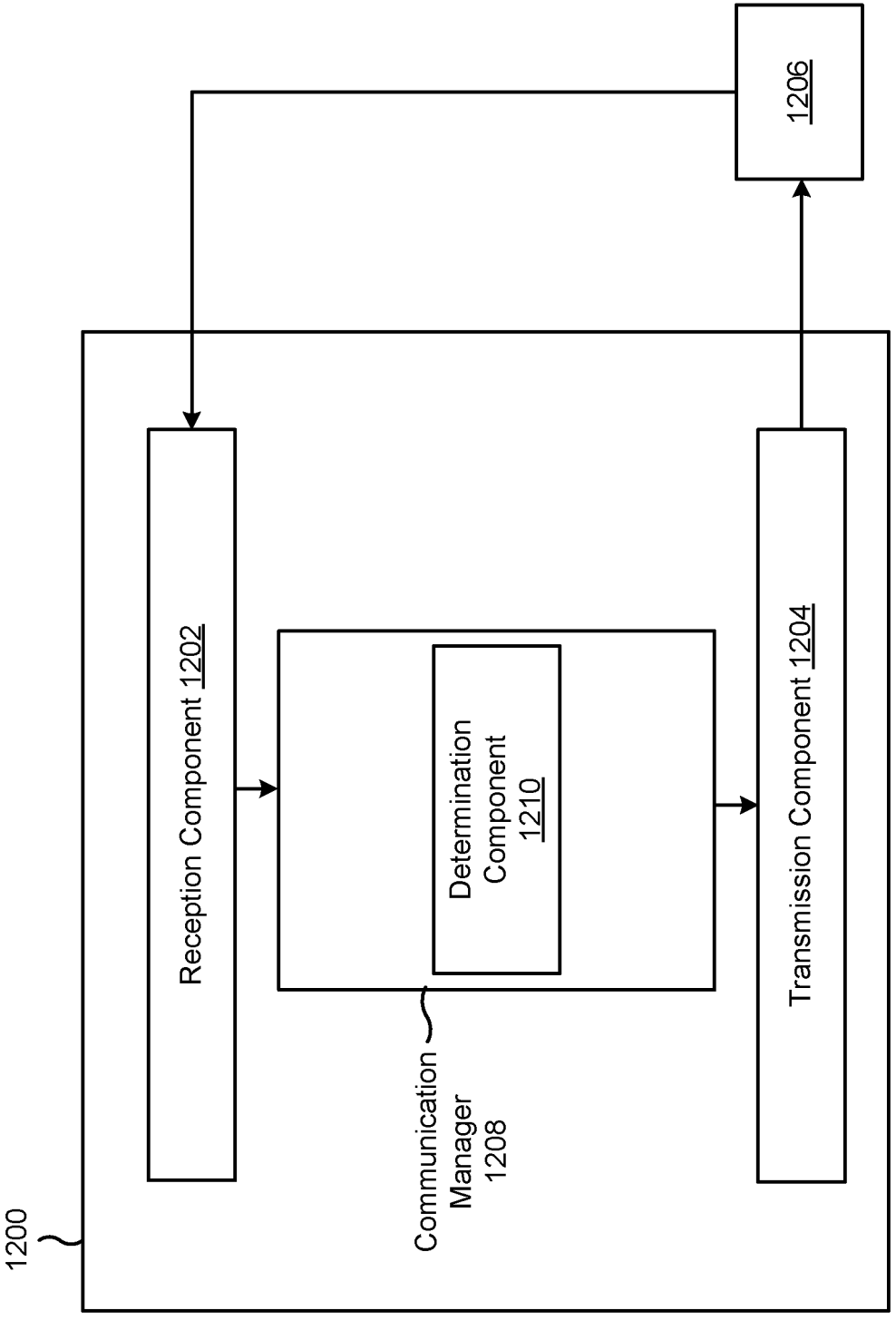

FIG. 12 is a block diagram of an example apparatus 1200 for wireless communication. The apparatus 1200 may be a receiver, or a receiver may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a communication manager 1208 (e.g., the communication manager 140 or the communication manager 150, shown in FIGS. 1 and 2). The communication manager 1208 may include a determination component 1210.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the UE and/or the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the UE and/or the base station described in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the UE and/or the base station described in connection with FIG. 2. In some aspects, the transmission component 1204 may be co-located with the reception component 1202 in a transceiver.

The determination component 1210 may determine an azimuth mode configuration for receiving a data stream, wherein the azimuth mode configuration indicates one or more azimuth modes. In some aspects, the determination component 1210 may include one or more antennas, a modulator, a transmit MIMO processor, a transmit processor, a controller/processor, a memory, or a combination thereof, of the UE and/or the base station described in connection with FIG. 2. In some aspects, the determination component 1210 may include the reception component 1202 and/or the transmission component 1204.

The reception component 1202 may receive, from a transmitter of the OAM multiplexing based communication, the data stream based at least in part on the azimuth mode configuration.

The communication manager 1208 may activate, based at least in part on the azimuth mode configuration, a set of receiver antennas associated with a receiver circle. The communication manager 1208 may activate, based at least in part on the azimuth mode configuration, an additional set of receiver antennas associated with an additional receiver circle. In some aspects, the communication manager 1208 may include one or more antennas, a modulator, a transmit MIMO processor, a transmit processor, a controller/processor, a memory, or a combination thereof, of the UE and/or the base station described in connection with FIG. 2. In some aspects, the communication manager 1208 may include the reception component 1202, the transmission component 1204, and/or the determination component 1210.

The determination component 1210 may determine a radial mode configuration for receiver the data stream, wherein the radial mode configuration indicates one or more radial modes wherein activating the set of receiver antennas is further based at least in part on the radial mode configuration.

The transmission component 1204 may transmit, to the transmitter, a feedback message comprising beamforming information that indicates a maximum azimuth mode order. The reception component 1202 may receive, from the transmitter, a CSIF configuration. The transmission component 1204 may transmit, to the transmitter, CSIF based at least in part on the CSIF configuration.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a transmitter of orbital angular momentum (OAM) multiplexing based communication, comprising: determining an azimuth mode configuration for transmitting a data stream, wherein the azimuth mode configuration indicates one or more azimuth modes; and transmitting, to a receiver of the OAM multiplexing based communication, the data stream based at least in part on the azimuth mode configuration.

Aspect 2: The method of Aspect 1, further comprising activating, based at least in part on the azimuth mode configuration, a set of transmitter antennas associated with a transmitter circle.

Aspect 3: The method of Aspect 2, wherein the set of transmitter antennas are arranged on the transmitter circle such that a first angular offset corresponding to a first pair of transmitter antennas equals a second angular offset corresponding to a second pair of transmitter antennas.

Aspect 4: The method of either of Aspects 2 or 3, wherein a number of transmitter antennas in the set of transmitter antennas is greater than or equal to a number of azimuth modes in the one or more azimuth modes, and wherein the one or more azimuth modes are mutually orthogonal.

Aspect 5: The method of Aspect 4, wherein the number of transmitter antennas in the set of transmitter antennas equals the number of azimuth modes in the one or more azimuth modes.

Aspect 6: The method of Aspect 5, wherein determining the azimuth mode configuration comprises determining that the number of azimuth modes in the one or more azimuth modes is one, and wherein activating the set of transmitter antennas comprises activating a center antenna of the transmitter circle based at least in part on determining that the number of azimuth modes in the one or more azimuth modes is one.

Aspect 7: The method of any of Aspects 2-6, further comprising activating, based at least in part on the azimuth mode configuration, an additional set of transmitter antennas associated with an additional transmitter circle.

Aspect 8: The method of Aspect 7, wherein a number of transmitter antennas in the additional set of transmitter antennas equals a number of transmitter antennas in the set of transmitter antennas.

Aspect 9: The method of any of Aspects 2-8, further comprising determining a radial mode configuration for transmitting the data stream, wherein the radial mode configuration indicates one or more radial modes, and wherein activating the set of transmitter antennas is further based at least in part on the radial mode configuration.

Aspect 10: The method of any of Aspects 1-9, wherein determining the azimuth mode configuration comprises determining the azimuth mode configuration based at least in part on an azimuth mode order sequence scheme that indicates a sequential increase in values of an azimuth mode order index.

Aspect 11: The method of Aspect 10, wherein a difference between a first value of the azimuth mode order index and a second value of the azimuth mode order index is a power of two.

Aspect 12: The method of either of Aspects 10 or 11, wherein the azimuth mode configuration indicates a plurality of azimuth mode orders, and wherein the method further comprises performing analog beamforming to establish the plurality of azimuth mode orders.

Aspect 13: The method of any of Aspects 1-12, further comprising receiving, from the receiver, a feedback message comprising beamforming information that indicates a maximum azimuth mode order.

Aspect 14: The method of Aspect 13, wherein receiving the feedback message comprises receiving the feedback message based at least in part on an open-loop feedback configuration.

Aspect 15: The method of any of Aspects 1-14, further comprising transmitting, to the receiver, a circle selection information feedback (CSIF) configuration.

Aspect 16: The method of Aspect 15, wherein the CSIF configuration comprises a representation configuration that indicates at least one bit function for determining a number of bits to use to indicate a set of selected transmitter circles.

Aspect 17: The method of Aspect 16, wherein the at least one bit function comprises a logarithmic function of a number of selected transmitter circles and a number of candidate transmitter circles.

Aspect 18: The method of Aspect 16, wherein the at least one bit function indicates that the number of bits to use to indicate the set of selected transmitter circles is equal to a number of candidate transmitter circles.

Aspect 19: The method of Aspect 16, wherein the at least one bit function comprises a first bit function and a second bit function, and wherein the representation configuration comprises an indication to use: the first bit function, the second bit function, or the bit function of the first bit function and the second bit function that indicates a smallest number of bits to use to indicate the set of selected transmitter circles.

Aspect 20: The method of any of Aspects 15-19, wherein the CSIF configuration includes at least one of: a list of one or more candidate transmitter circles, or an indication that a candidate transmitter circle of the one or more candidate transmitter circles includes a central transmitter antenna.

Aspect 21: The method of any of Aspects 15-20, further comprising receiving, from the receiver, CSIF based at least in part on the CSIF configuration.

Aspect 22: The method of Aspect 21, wherein the CSIF comprises at least one of: an indication of a set of selected transmitter circles of the one or more candidate transmitter circles, an indication of a relation between a selection of one or more modes and the set of selected transmitter circles, or an indication of a selected transmitter circle of the set of selected transmitter circles that is used for a mode of the selection of one or more modes.

Aspect 23: The method of Aspect 22, wherein a selected transmitter circle comprises a central antenna, and wherein the indication of the set of selected transmitter circles does not indicate a circle selection corresponding to an OAM mode zero based at least in part on a determination that the selected transmitter circle comprises a central antenna.

Aspect 24: The method of Aspect 22, wherein a selected transmitter circle does not include a central antenna, and wherein the indication of the set of selected transmitter circles indicates a circle selection corresponding to an OAM mode zero based at least in part on a determination that the selected transmitter circle does not include a central antenna.

Aspect 25: The method of any of Aspects 22-24, wherein the CSIF comprises OAM mode relationship information that indicates one or more OAM modes corresponding to one or more selected transmitter circles of the set of selected transmitter circles.

Aspect 26: The method of Aspect 25, wherein receiving the CSIF comprises: receiving a first feedback message that includes a first portion of the OAM mode relationship information; and receiving a second feedback message that includes a second portion of the OAM mode relationship information.

Aspect 27: A method of wireless communication performed by a receiver of orbital angular momentum (OAM) multiplexing based communication, comprising: determining an azimuth mode configuration for receiving a data stream, wherein the azimuth mode configuration indicates one or more azimuth modes; and receiving, from a transmitter of the OAM multiplexing based communication, the data stream based at least in part on the azimuth mode configuration.

Aspect 28: The method of Aspect 27, further comprising activating, based at least in part on the azimuth mode configuration, a set of receiver antennas associated with a receiver circle.

Aspect 29: The method of Aspect 28, wherein the set of receiver antennas are arranged on the receiving circle such that a first angular offset corresponding to a first pair of receiver antennas equals a second angular offset corresponding to a second pair of receiver antennas.

Aspect 30: The method of either of Aspects 28-29, wherein a number of receiver antennas in the set of receiver antennas is greater than or equal to a number of azimuth modes in the one or more azimuth modes, and wherein the one or more azimuth modes are mutually orthogonal.

Aspect 31: The method of Aspect 30, wherein the number of receiver antennas in the set of receiver antennas equals the number of azimuth modes in the one or more azimuth modes.

Aspect 32: The method of Aspect 31, wherein determining the azimuth mode configuration comprises determining that the number of azimuth modes in the one or more azimuth modes is one, and wherein activating the set of receiver antennas comprises activating a center antenna of the receiver circle based at least in part on determining that the number of azimuth modes in the one or more azimuth modes is one.

Aspect 33: The method of any of Aspects 28-32, further comprising activating, based at least in part on the azimuth mode configuration, an additional set of receiver antennas associated with an additional receiver circle.

Aspect 34: The method of Aspect 33, wherein a number of receiver antennas in the additional set of receiver antennas equals a number of receiver antennas in the set of receiver antennas.

Aspect 35: The method of any of Aspects 28-34, further comprising determining a radial mode configuration for receiver the data stream, wherein the radial mode configuration indicates one or more radial modes, and wherein activating the set of receiver antennas is further based at least in part on the radial mode configuration.

Aspect 36: The method of any of Aspects 27-35, wherein determining the azimuth mode configuration comprises determining the azimuth mode configuration based at least in part on an azimuth mode order sequence scheme that indicates a sequential increase in values of an azimuth mode order index.

Aspect 37: The method of Aspect 36, wherein a difference between a first value of the azimuth mode order index and a second value of the azimuth mode order index is a power of two.

Aspect 38: The method of Aspect 37, wherein the azimuth mode configuration indicates a plurality of azimuth mode orders, and wherein the method further comprises performing analog beamforming to establish the plurality of azimuth mode orders.

Aspect 39: The method of any of Aspects 27-38, further comprising transmitting, to the transmitter, a feedback message comprising beamforming information that indicates a maximum azimuth mode order.

Aspect 40: The method of Aspect 39, wherein transmitting the feedback message comprises transmitting the feedback message based at least in part on an open-loop feedback configuration.

Aspect 41: The method of any of Aspects 27-40, further comprising receiving, from the transmitter, a circle selection information feedback (CSIF) configuration.

Aspect 42: The method of Aspect 41, wherein the CSIF configuration comprises a representation configuration that indicates at least one bit function for determining a number of bits to use to indicate a set of selected transmitter circles.

Aspect 43: The method of Aspect 42, wherein the at least one bit function comprises a logarithmic function of a number of selected transmitter circles and a number of candidate transmitter circles.

Aspect 44: The method of Aspect 42, wherein the at least one bit function indicates that the number of bits to use to indicate the set of selected transmitter circles is equal to a number of candidate transmitter circles.

Aspect 45: The method of Aspect 42, wherein the at least one bit function comprises a first bit function and a second bit function, and wherein the representation configuration comprises an indication to use: the first bit function, the second bit function, or the bit function of the first bit function and the second bit function that indicates a smallest number of bits to use to indicate the set of selected transmitter circles.

Aspect 46: The method of any of Aspects 41-45, wherein the CSIF configuration includes at least one of: a list of one or more candidate transmitter circles, or an indication that a candidate transmitter circle of the one or more candidate transmitter circles includes a central transmitter antenna.

Aspect 47: The method of any of Aspects 41-46, further comprising transmitting, to the transmitter, CSIF based at least in part on the CSIF configuration.

Aspect 48: The method of Aspect 47, wherein the CSIF comprises at least one of: an indication of a set of selected transmitter circles of the one or more candidate transmitter circles, an indication of a relation between a selection of one or more modes and the set of selected transmitter circles, or an indication of a selected transmitter circle of the set of selected transmitter circles that is used for a mode of the selection of one or more modes.

Aspect 49: The method of Aspect 48, wherein a selected transmitter circle comprises a central antenna, and wherein the indication of the set of selected transmitter circles does not indicate a circle selection corresponding to an OAM azimuth mode zero based at least in part on a determination that the selected transmitter circle comprises a central antenna.

Aspect 50: The method of Aspect 48, wherein a selected transmitter circle does not include a central antenna, and wherein the indication of the set of selected transmitter circles indicates a circle selection corresponding to an OAM azimuth mode zero based at least in part on a determination that the selected transmitter circle does not include a central antenna.

Aspect 51: The method of any of Aspects 48-50, wherein the CSIF comprises OAM mode relationship information that indicates one or more OAM modes corresponding to one or more selected transmitter circles of the set of selected transmitter circles.

Aspect 52: The method of Aspect 51, wherein transmitting the CSIF comprises: receiving a first feedback message that includes a first portion of the OAM mode relationship information; and receiving a second feedback message that includes a second portion of the OAM mode relationship information.

Aspect 53: An apparatus for wireless communication at a device, comprising a processor; memory coupled with the processor; and instructions stored in the memory and executable by the processor to cause the apparatus to perform the method of one or more of Aspects 1-26.

Aspect 54: A device for wireless communication, comprising a memory and one or more processors coupled to the memory, the one or more processors configured to perform the method of one or more of Aspects 1-26.

Aspect 55: An apparatus for wireless communication, comprising at least one means for performing the method of one or more of Aspects 1-26.

Aspect 56: A non-transitory computer-readable medium storing code for wireless communication, the code comprising instructions executable by a processor to perform the method of one or more of Aspects 1-26.

Aspect 57: A non-transitory computer-readable medium storing a set of instructions for wireless communication, the set of instructions comprising one or more instructions that, when executed by one or more processors of a device, cause the device to perform the method of one or more of Aspects 1-26.

Aspect 58: An apparatus for wireless communication at a device, comprising a processor; memory coupled with the processor; and instructions stored in the memory and executable by the processor to cause the apparatus to perform the method of one or more of Aspects 27-52.

Aspect 59: A device for wireless communication, comprising a memory and one or more processors coupled to the memory, the one or more processors configured to perform the method of one or more of Aspects 27-52.

Aspect 60: An apparatus for wireless communication, comprising at least one means for performing the method of one or more of Aspects 27-52.

Aspect 61: A non-transitory computer-readable medium storing code for wireless communication, the code comprising instructions executable by a processor to perform the method of one or more of Aspects 27-52.

Aspect 62: A non-transitory computer-readable medium storing a set of instructions for wireless communication, the set of instructions comprising one or more instructions that, when executed by one or more processors of a device, cause the device to perform the method of one or more of Aspects 27-52.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A transmitter of orbital angular momentum (OAM) multiplexing based communication, comprising:
   a memory; and
   one or more processors, coupled to the memory, configured to:

determine an azimuth mode configuration for transmitting a data stream, wherein the azimuth mode configuration indicates one or more azimuth modes;
   activate, based at least in part on the azimuth mode configuration, a set of transmitter antennas associated with a transmitter circle; and
   transmit, to a receiver of the OAM multiplexing based communication, the data stream based at least in part on the azimuth mode configuration.

2. The transmitter of claim 1, wherein the set of transmitter antennas are arranged on the transmitter circle such that a first angular offset corresponding to a first pair of transmitter antennas equals a second angular offset corresponding to a second pair of transmitter antennas.

3. The transmitter of claim 1, wherein a number of transmitter antennas in the set of transmitter antennas is greater than or equal to a number of azimuth modes in the one or more azimuth modes, and wherein the one or more azimuth modes are mutually orthogonal.

4. The transmitter of claim 3, wherein the number of transmitter antennas in the set of transmitter antennas equals the number of azimuth modes in the one or more azimuth modes.

5. The transmitter of claim 4, wherein the one or more processors, to determine the azimuth mode configuration, are configured to determine that the number of azimuth modes in the one or more azimuth modes is one, and wherein the one or more processors, to activate the set of transmitter antennas, are configured to activate a center antenna of the transmitter circle based at least in part on determining that the number of azimuth modes in the one or more azimuth modes is one.

6. The transmitter of claim 1, wherein the one or more processors are further configured to activate, based at least in part on the azimuth mode configuration, an additional set of transmitter antennas associated with an additional transmitter circle.

7. The transmitter of claim 6, wherein a number of transmitter antennas in the additional set of transmitter antennas equals a number of transmitter antennas in the set of transmitter antennas.

8. The transmitter of claim 1, wherein the one or more processors are further configured to determine a radial mode configuration for transmitting the data stream, wherein the radial mode configuration indicates one or more radial modes, and
   wherein the one or more processors, to activate the set of transmitter antennas, are configured to activate the set of transmitter antennas based at least in part on the radial mode configuration.

9. The transmitter of claim 1, wherein the one or more processors, to determine the azimuth mode configuration, are configured to determine the azimuth mode configuration based at least in part on an azimuth mode order sequence scheme that indicates a sequential increase in values of an azimuth mode order index.

10. The transmitter of claim 9, wherein a difference between a first value of the azimuth mode order index and a second value of the azimuth mode order index is a power of two.

11. The transmitter of claim 9, wherein the azimuth mode configuration indicates a plurality of azimuth mode orders, and
   wherein the one or more processors are further configured to perform analog beamforming to establish the plurality of azimuth mode orders.

12. The transmitter of claim 1, wherein the one or more processors are further configured to receive, from the receiver, a feedback message comprising beamforming information that indicates a maximum azimuth mode order.

13. The transmitter of claim 12, wherein the one or more processors, to receive the feedback message, are configured to receive the feedback message based at least in part on an open-loop feedback configuration.

14. The transmitter of claim 1, wherein the one or more processors are further configured to transmit, to the receiver, a circle selection information feedback (CSIF) configuration.

15. The transmitter of claim 14, wherein the CSIF configuration comprises a representation configuration that indicates at least one bit function for determining a number of bits to use to indicate a set of selected transmitter circles.

16. The transmitter of claim 15, wherein the at least one bit function comprises a logarithmic function of a number of selected transmitter circles and a number of candidate transmitter circles.

17. The transmitter of claim 15, wherein the at least one bit function indicates that the number of bits to use to indicate the set of selected transmitter circles is equal to a number of candidate transmitter circles.

18. The transmitter of claim 15, wherein the at least one bit function comprises a first bit function and a second bit function, and wherein the representation configuration comprises an indication to use:
   the first bit function,
   the second bit function, or
   the bit function of the first bit function and the second bit function that indicates a smallest number of bits to use to indicate the set of selected transmitter circles.

19. The transmitter of claim 14, wherein the CSIF configuration includes at least one of:
   a list of one or more candidate transmitter circles, or
   an indication that a candidate transmitter circle of the one or more candidate transmitter circles includes a central transmitter antenna.

20. The transmitter of claim 14, wherein the one or more processors are further configured to receive, from the receiver, CSIF based at least in part on the CSIF configuration.

21. The transmitter of claim 20, wherein the CSIF comprises at least one of:
   an indication of a set of selected transmitter circles of the one or more candidate transmitter circles,
   an indication of a relation between a selection of one or more modes and the set of selected transmitter circles, or
   an indication of a selected transmitter circle of the set of selected transmitter circles that is used for a mode of the selection of one or more modes.

22. The transmitter of claim 21, wherein a selected transmitter circle comprises a central antenna, and wherein the indication of the set of selected transmitter circles does not indicate a circle selection corresponding to an OAM azimuth mode zero based at least in part on a determination that the selected transmitter circle comprises the central antenna.

23. The transmitter of claim 21, wherein a selected transmitter circle does not include a central antenna, and wherein the indication of the set of selected transmitter circles indicates a circle selection corresponding to an OAM azimuth mode zero based at least in part on a determination that the selected transmitter circle does not include the central antenna.

24. The transmitter of claim 21, wherein the CSIF comprises OAM mode relationship information that indicates one or more OAM modes corresponding to one or more selected transmitter circles of the set of selected transmitter circles.

25. The transmitter of claim 24, wherein the one or more processors, to receive the CSIF, are configured to:
   receive a first feedback message that includes a first portion of the OAM mode relationship information; and
   receive a second feedback message that includes a second portion of the OAM mode relationship information.

26. A receiver of orbital angular momentum (OAM) multiplexing based communication, comprising:
   a memory; and
   one or more processors, coupled to the memory, configured to:
   determine an azimuth mode configuration for receiving a data stream, wherein the azimuth mode configuration indicates one or more azimuth modes;
   receive, from a transmitter of the OAM multiplexing based communication, the data stream based at least in part on the azimuth mode configuration; and
   receive, from the transmitter, a circle selection information feedback (CSIF) configuration, wherein the CSIF configuration comprises a representation configuration that indicates at least one bit function for determining a number of bits to use to indicate a set of selected transmitter circles.

27. A method of wireless communication performed by a transmitter of orbital angular momentum (OAM) multiplexing based communication, comprising:
   determining an azimuth mode configuration for transmitting a data stream, wherein the azimuth mode configuration indicates one or more azimuth modes;
   activating, based at least in part on the azimuth mode configuration, a set of transmitter antennas associated with a transmitter circle; and
   transmitting, to a receiver of the OAM multiplexing based communication, the data stream based at least in part on the azimuth mode configuration.

28. A method of wireless communication performed by a receiver of orbital angular momentum (OAM) multiplexing based communication, comprising:
   determining an azimuth mode configuration for receiving a data stream, wherein the azimuth mode configuration indicates one or more azimuth modes; and
   receiving, from a transmitter of the OAM multiplexing based communication, the data stream based at least in part on the azimuth mode configuration; and
   receiving, from the transmitter, a circle selection information feedback (CSIF) configuration, wherein the CSIF configuration comprises a representation configuration that indicates at least one bit function for determining a number of bits to use to indicate a set of selected transmitter circles.

* * * * *